United States Patent
Waag et al.

(10) Patent No.: US 7,867,166 B2
(45) Date of Patent: Jan. 11, 2011

(54) STATISTICAL ESTIMATION OF ULTRASONIC PROPAGATION PARAMETERS FOR ABERRATION CORRECTION

(75) Inventors: Robert C. Waag, Rochester, NY (US); Jeffrey P. Astheimer, Honeoye Falls, NY (US)

(73) Assignee: University of Rochester, Rochester, NY (US)

( * ) Notice: Subject to any disclaimer, the term of this patent is extended or adjusted under 35 U.S.C. 154(b) by 1563 days.

(21) Appl. No.: 11/192,393

(22) Filed: Jul. 29, 2005

(65) Prior Publication Data

US 2006/0064012 A1 Mar. 23, 2006

Related U.S. Application Data

(60) Provisional application No. 60/591,921, filed on Jul. 29, 2004.

(51) Int. Cl.
*A61B 8/00* (2006.01)

(52) U.S. Cl. .................. 600/437; 600/443; 600/447; 600/458; 600/459; 73/609; 73/627; 73/629

(58) Field of Classification Search ............ 600/437, 600/443, 447, 458, 459; 73/609, 627, 629
See application file for complete search history.

(56) References Cited

U.S. PATENT DOCUMENTS

| | | | |
|---|---|---|---|
| 4,852,577 A | | 8/1989 | Smith et al. |
| 5,487,306 A | | 1/1996 | Fortes |
| 6,023,977 A | * | 2/2000 | Langdon et al. ............... 73/629 |
| 6,131,458 A | * | 10/2000 | Langdon et al. ............... 73/627 |
| 6,223,599 B1 | * | 5/2001 | Langdon et al. ............... 73/627 |
| 6,401,539 B1 | * | 6/2002 | Langdon et al. ............... 73/609 |
| 6,485,423 B2 | * | 11/2002 | Angelsen et al. ............ 600/458 |
| 6,508,764 B1 | * | 1/2003 | Thiele et al. ................. 600/437 |
| 6,692,439 B1 | * | 2/2004 | Walker et al. ................ 600/443 |
| 6,905,465 B2 | * | 6/2005 | Angelsen et al. ............ 600/437 |
| 7,273,455 B2 | * | 9/2007 | Angelsen et al. ............ 600/437 |

OTHER PUBLICATIONS

A. Bjorck, et al., "Numerical Methods for Least Squares Problems", Society for Industrial and Applied Mathematics, Philadelphia, PA, pp. 100-102.
S. Masoy, "Estimation of Ultrasound Wave Aberration With Signals From Random Scatters", J. Acoust. Soc. Am., Jun. 2004, vol. 116, No. 6, pp. 2998-3009.
S. L. Hagen-Amsert, "Textbook of Diagnostic Ultrasonography", C. V. Mosby Co., St. Louis MO, 1995, I & II.
P. Kramer, et al., "Measurement of Spatial Time-of-Flight Fluctuations of Ultrasound Pulses Passing through Inhomogeneous Layers,", Proc. IEEE 1987 Ultrason. Symp. 2:939-942 (1987).

(Continued)

*Primary Examiner*—Brian Casler
*Assistant Examiner*—Baisakhi Roy
(74) *Attorney, Agent, or Firm*—Blank Rome LLP

(57) ABSTRACT

In estimation of an aberration in propagation of an ultrasonic wave from an aperture through an aberration path, the aperture is modeled as a plurality of sources and receivers. The frequency-domain magnitude of the aberration is estimated by normalizing the scattered signal power spectrum. The frequency-domain phase of the aberration is estimated by a recursion using cross spectra of signals at neighboring receivers.

60 Claims, 6 Drawing Sheets

OTHER PUBLICATIONS

L. M. Hinkelman, et al. Measurement of Ultrasonic Pulse Arrival Time and Energy Level Variations Produced by Propagation through Abdominal Wall.

G. E. Trahey, et al., "In-Vivo Measurements of Ultrasonic Beam Distortion in the Breast", Ultrason. Imaging, 13(1):71-90 (1991).

L. M. Hinkelman, et al., "Measurement and Correction of Ultrasonic Pulse Distortion Produced by the Human Breast", J. Acoust. Soc. Am., 97(3):1958-1969 (1995).

L. M., et al. "Measurement of Ultrasonic Pulse Distortion Produced by Human Chest Wall", J. Acoust. Soc. Am. 101(4):2365-2373 (1997).

S. W. Flax, et al., "Phase-Aberration Correction Using Signals from Point Reflectors and Diffuse Scatterers", IEEE Trans. Ultrason., Ferroelect., Freq. Contr., 35 (6):758-774 (1988).

L. Nock, et al., "Phase Aberration Correction in Medical Ultrasound Using Speckle Brightness as a Quality Factor", J. Acoust. Soc. Am., 85(5):1819-1833 (1989).

D.-L. Liu, et al., "Time-Shift Compensation of Ultrasonic Pulse Focus Degradation Using Least-Mean-Square Error Estimates of Arrival Time", J. Acoust. Soc. Am., 95(1):542-555 (1994).

D.-L. Liu, et al., "Correction of Ultrasonic Wavefront Distortion Using Back-propagation and a Reference Waveform Method for Time-Shift Compensation", J. Acoust. Soc. Am., 96(2):649-660 (1994).

F. Lin, et al. "Estimation and Compensation of Ultrasonic Wavefront Distortion Using a Blind System Identification Method", IEEE Trans. Ultrason. Ferroelect., Freq. Contr. 49(6):739-755 (2002).

S. Haykin, "Blind Deconvolution" Prentice Hall, Englewood Cliffs, NJ, 1994.

G. Xu, et al., "At Least-Squares Approach to Blind Channel Indentification", IEEE Trans. Signal Processing, 43(12):2928-2993 (1995).

Y. Hua, "Fast Maximum Likelihood for Blind Identification of Multiple FIR Channels", IEEE Trans. Signal Processing, 44(3):661-672 (1996).

E. Moulines, et al., "Subspace Methods for the Blind Identification of Mutlichannel FIR Filters", IEEE Trans. Signal Processing, 43(2):516-525 (1995).

K. Abed-Meraim, et al., "Blind System Identification", Proc. IEEE, 85(8):1310-1322 (1997).

P. M. Morse, et al., "Theoretical Acoustics",McGraw-Hill, New York, 1968, Sec. 7:3.

A. I. Nachman, et al., "An Equation for Acoustic Propagation in Inhomogeneous Media with Relaxation Losses", J. Acoust. Soc. Am., 88(3):1584-1595 (1990).

P. M. Morse, et al., "Theoretical Acoustics" McGraw-Hill, New York, 1968, Sec. 8.1.

R. C. Waag, et al., "Characterization of Measurement Effects in Ultrasonic Scattering Measurements", J. Acoust. Soc. Am., 88(5):2418-2436 (1990).

W. C. Pilkington, "Isoplanatic Path Size for Aberration Correction in Ultrasonic Imaging", Diagnostic Ultrasound Laboratory Research Laboratory, University of Rochester, Rochester, NY, Report DURL 01-01, May 2001.

B. Angelsen, "Ultrasound Imaging: Waves, Signals, and Signal Processing—vol. I" Emantec AS, Trondheim, Norway, 2000, Ch. 11, pp. 11.59.

B. Angelsen, "Ultrasound Imaging: Waves, Signals, and Signal Processing—vol. II" Emantec AS, Trondheim, Norway, 2000, Ch. 11, pp. 11.61.

D. Ghiglia, et al., "Two-Dimensional Phase Unwrapping", John Wiley & Sons, Inc., New York, 1998, Ch. 5, Sec. 3.2 and Sec. 3.3.

J. Lacefield, et al., "Time-Shift Estimation and Focusing Through Distributed Aberration Using Multirow Arrays", IEEE Trans. Ultrason., Ferroelect., Freq. Contr., 48(6):1606-1624 (2001.

J. Lacefield, et al., "Comparisons of Lesion Detectablility in Ultrasound Images Acquired Using Time-Shift Compensation and Spatial Compounding", IEEE Trans. Ultrason., Ferroelect., Freq. Contr. in press.

E. Madsen, et al., "Oil-in-Gel Dispersions for Use as Ultrasonically Tissue-Mimicking Materials", Ultrasound Med. Bio., 8(3):277-287 (1982).

J. Lacefield, et al., A Distributed Aberrator for Emulation of Pulse Distortion by Abdominal Wall, Acoust. Res. Lett. Online, 3(2):47-52 (2002).

R. Blackman, et al., "The Measurement of Power Spectra" (Dover Publications, New York 1959), p. 98.

A. Tikhonov, "Regularization of Incorrectly Posed Problems", Soviet Math., 4:1624-1627 (1963).

A. Bjorck, "Numerical Methods for Least Squares Problems", Soc. Indust. Appl. Math., Philadelphia, PA, 1996, Sec. 2.7.2.

M. Tanter, et al., "Focusing and Steering through Absorbing and Aberration Layers" Application to Ultrasonic Propagation through the Skull, J. Acoust. Soc. Am., 103(5):2403-2410 (1998).

J. Goodman, "Introduction to Fourier Optics" McGraw-Hill, New York, 1968, Chap. 3.

M. Fink, "Time-Reversal of Ultrasonic Fields—Part I: Basic Principles", IEEE Trans. Ultrason., Ferroelec., Freq. Contr. 39(5):555-566 (1992).

Robert C. Waag, et al., "Statistical Estimation of Ultrasonic Propagation Path Parameters for Aberration Correction", IEEE Transaction of Ultrasonics, Ferroelectrics, and Frequency Control, vol. 52, No. 5, May 2005, pp. 851-869.

* cited by examiner

POINT REFLECTOR
WATER PATH

RANDOM MEDIUM
WATER PATH

POINT REFLECTOR
UNCOMPENSATED

RANDOM MEDIUM
UNCOMPENSATED

POINT REFLECTOR
COMPENSATED

RANDOM MEDIUM
COMPENSATED 10    25    40    55    70

STATISTICAL ESTIMATION OF ULTRASONIC PROPAGATION PARAMETERS FOR ABERRATION CORRECTION

REFERENCE TO RELATED APPLICATION

The present application claims the benefit of U.S. Provisional Patent Application No. 60/591,921, filed Jul. 29, 2004, whose disclosure is hereby incorporated by reference in its entirety into the present disclosure.

STATEMENT OF GOVERNMENT INTEREST

The work resulting in the present invention was supported by the National Institutes of Health under Grant Nos. HL50855, CA74050 and EB00280 and the Office of Naval Research under Grant No. N00014-96-1-0749. The government has certain rights in the invention.

DESCRIPTION OF RELATED ART

Ultrasound imaging has been the largest growing medical imaging modality in the last fifteen years. Reasons for that are that many disorders can be diagnosed efficiently with ultrasound, the equipment has relatively low cost, and does not require special building adaptations. A promising area for future growth is the market introduction of portable ultrasound imaging equipment. Ultrasound imaging is also widely used for guidance of tissue biopsies and other minimally invasive procedures.

An example is screening of selected groups of the population for early detection of tumors. Early detection of cancers may increase the survival rate, and simple detection methods may provide opportunities for screening selected groups of the population with ultrasound imaging. The low cost and portability of ultrasound equipment makes such screening easier, compared to using more heavy and expensive X-ray and MR equipment.

Clinical systems typically operate in a pulse-echo mode with transmit and receive beams that are focused using the assumption that the propagation medium is essentially homogeneous, i.e., the density, attenuation, and sound speed are constant throughout the propagation path. That assumption may, however, be unrealistic and aberration produced by inhomogeneities can result in unsatisfactory images.

Aberration reduces the clinical value of the images. The image degradation also limits the use of ultrasound for guidance of procedures. Hence, improving the image quality and resolution in the ultrasound images will greatly increase the clinical potential of ultrasound imaging in many applications.

Measurements of aberration in transmission configurations have provided numerical data about variations in time shifts, waveform energy, and pulse shape that result from propagation through tissue. Aberration has been modeled and corrected by using a timeshift screen in the receive aperture or at an intermediate position between the receive aperture and the region of the source or by using a bank of linear filters. Although timeshift can be an important part of aberration, a timeshift screen in the receiving aperture is incapable of modeling amplitude changes and a single timeshift screen located at a fixed distance from the receiving aperture is an oversimplified model for aberration that is distributed along the propagation path. A bank of filters, however, can model complex aberration with an accuracy that increases with the number of parameters in the filters.

Methods to determine simultaneously unknown filter parameters and an unknown signal have been developed for applications in the area of communications. Those methods for so-called blind system identification all depend on the validity of a common source assumption in which the signal at each receive element is assumed to have originated from the same source. Although that method has been shown to work for scattering from a random medium when the illumination is sufficiently concentrated, possibly by use of an initial correction such as timeshift compensation, the method is computationally demanding for a large number of elements and may require an initial compensation using another approach to converge. An alternative method that is not limited by the common source assumption and also is not as computationally demanding is desirable.

The benefits of aberration correction may be summarized as follows:

sharper images will be obtained over a wide group of patients, facilitating a more accurate diagnosis of diseases for all categories of patients and illnesses;

improved diagnosis of cancer tumors;

improved focusing quality of ultrasound minimally invasive surgery tools (High Intensity Focused Ultrasound) for treatment of localized cancer tumors; and better detection of blood flow, improving contrast agent imaging methods as well as Doppler methods.

Phase aberration is encountered in many practical imaging situations that include breast imaging and abdominal imaging. That loss of image quality and degradation in resolution limits ultrasound imaging technology to a significant extent. A solution that enables the adaptive adjustment of focusing delays to maintain the resolution and image quality under practical conditions would be of great value to boost and extend the applications of that technology.

Current methods to correct aberration either use a timeshift screen that is based on an over-simplified model of aberration or are computationally intensive. One known solution to that problem uses a general filter-bank model for aberration correction. Such a bank of filters can model complex aberration with an accuracy that improves the focus of an imaging system substantially more than current compensating techniques.

U.S. Pat. No. 6,699,189 B1 shows the capability of the filter bank-model by using a more computationally intense so-called blind system identification method. The model for time-shift compensation can be viewed as a special case of the filter-bank model. Compared to the time-shift compensation method that uses only a single parameter (timeshift), the filter-bank approach has the advantage of using additional parameters to model aberration with the accuracy needed to achieve a specified resolution.

However, the solution disclosed in the 189 patent is still more computationally intensive than desired.

SUMMARY OF THE INVENTION

It will be appreciated from the above that a need exists in the art to overcome the above difficulties. It is therefore an object of the invention to develop a technique for estimating aberrations which is not limited by the common source assumption. It is another object of the invention to develop such a technique which is not to computationally demanding as those of the prior art.

To achieve the above and other objects, the present invention is directed to a technique which is based on a less stringent assumption than the common source assumption. Here, the assumption is that the aberration at each element of the array is independent of the scattered signal origin. To satisfy that condition, the scattered signals must emanate from closely situated scattering volumes. The randomness of the scattering is eliminated by averaging results from the different volumes. The method is based on the same linear filter bank model of propagation as in blind system identification but is faster than blind system identification because the method can be implemented using substantially less computation.

Parameters in a linear filter model for ultrasonic propagation are found using statistical estimation. The model employs an inhomogeneous-medium Greens function that is decomposed into a homogeneous-transmission term and a path-dependent aberration term. Power and cross-power spectra of random-medium scattering are estimated over the frequency band of the transmit-receive system by using closely situated scattering volumes. The frequency-domain magnitude of the aberration is obtained from a normalization of the power spectrum. The corresponding phase is reconstructed from cross-power spectra of subaperture signals at adjacent receive positions by a recursion. The subapertures constrain the receive sensitivity pattern to eliminate measurement system phase contributions. The recursion uses a Laplacian-based algorithm to obtain phase from phase differences. Pulse-echo waveforms were acquired from a point reflector and a tissue-like scattering phantom through a tissue-mimicking aberration path from neighboring volumes having essentially the same aberration path. Propagation path aberration parameters calculated from the measurements of random scattering through the aberration phantom agree with corresponding parameters calculated for the same aberrator and array position by using echoes from the point reflector. The results indicate the approach describes, in addition to time shifts, waveform amplitude and shape changes produced by propagation through distributed aberration under realistic conditions.

A filter-bank model of propagation from a point source was used to estimate and correct aberration like that occurring in ultrasonic b-scan imaging. The central assumptions of the theory are that the random-medium second-order statistics are the same around a number of focuses and that the focuses are within an aberration independent or isoplanatic volume. The analysis yields an expression for the power spectrum of the signal at individual array elements and also an expression for the cross spectrum of signals from neighboring subapertures.

The temporal-frequency magnitude of the aberration response is found by a normalization of the power spectrum. The corresponding phase of the aberration response is found by a recursion using the phase of the subaperture cross spectra. Calculation of the cross spectrum at subapertures of receive elements rather than the cross spectrum at individual receive elements enables a valid correspondence between cross spectral phase and the phase differences of aberration.

In experiments conducted with a two-dimensional array and aberration that mimics strong distortion produced by human abdominal wall, waveforms were transmitted and received through a water path and through the aberrator path from a point reflector and a random medium that mimics scattering by human liver. Aberration was compensated using time shifts estimated from geometrically focused illumination of the random medium and using statistical estimates of the aberration. The quality of estimates and the effectiveness of compensation were described by waveform similarity before and after compensation. Transmit and transmit-receive focuses were described using amplitude projections, effective widths, effective radius, and beamforming efficiencies. The results indicate that compensation of aberration by using the statistical estimation method disclosed herein can improve the focus of an imaging system substantially more than time-shift compensation and that the improvement can approach a diffraction-limited water-path focus after two iterations.

BRIEF DESCRIPTION OF THE DRAWINGS

A preferred embodiment of the present invention will be set forth in detail with reference to the drawings, in which.

DETAILED DESCRIPTION OF THE PREFERRED EMBODIMENT

Figure 1:
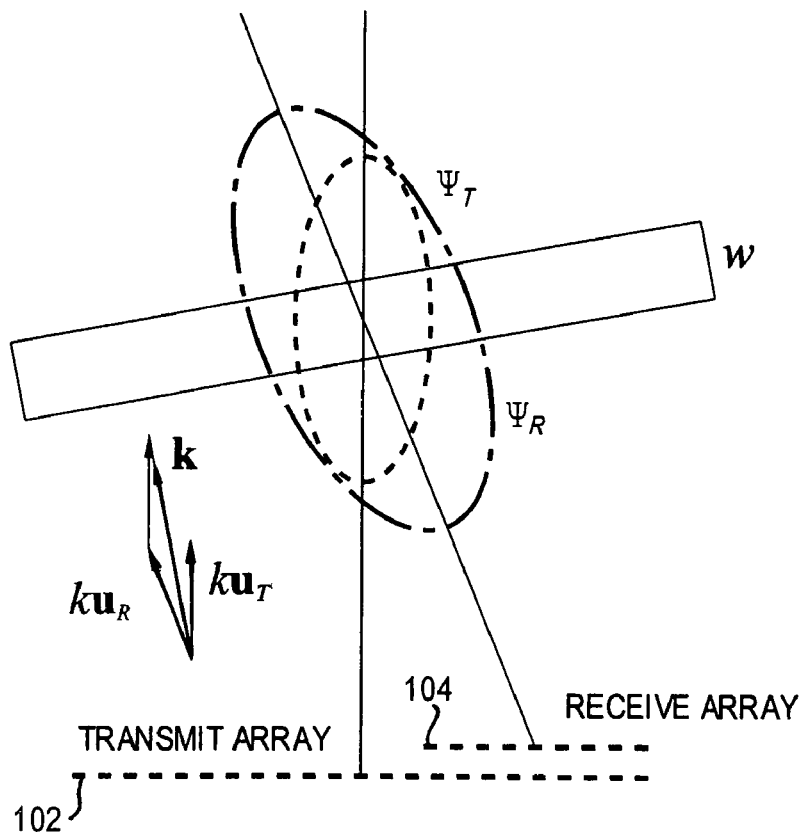
FIG. 1 is a diagram showing scattering volume weights used in performing the calculations of the preferred embodiment.

A preferred embodiment of the present invention will be set forth in detail with reference to the drawings, in which like reference numerals refer to like elements or method steps throughout.

An aspect of the present invention, in the terms of physical acoustics, is to determine from random scattering the Greens function throughout a receiving aperture for propagation through an inhomogeneous medium to or from a focus. The evaluation of that Greens function can be straightforward if an isolated point scatterer is available but such a point scatterer is not usually present in medical ultrasonic imaging. The more usual circumstance in medical ultrasonic imaging is, however, a random distribution of scatterers in the vicinity of the focus. For that latter case, which is considered here, the evaluation of the Greens function proceeds as follows. The inhomogeneous-medium Greens function is assumed to be a convolution of a homogeneous-path transmission term and a path-dependent aberration term. The temporal-frequency magnitude of the aberration term is found by a normalization of the scattered signal power spectrum. The temporal-frequency phase of the aberration term is found by a recursion that uses cross spectra of signals at neighboring receive subapertures. The theoretical basis for the procedures will now be described.

Consider a two-dimensional aperture that is used for acoustic transmission and reception in three-dimensional space. Assume the aperture is comprised of small transducer elements that individually behave like point sources and receivers, at least over a range of relevant frequencies. Assume further that an acoustic field $\psi_T(r, t, r_T, t_T)$ is transmitted from the aperture and that the field is comprised of impulses emitted with weights $A_i$ and delays $\tau_i$ from aperture element locations $\{r_i\}=1, 2, \ldots$. This field at location r and time t in an inhomogeneous medium can be written $$\psi_T(r, t, r_T, t_T) = \sum_i A_i G(r, t, r_i, t_T - \tau_i) \quad (1)$$

in which $G(r, t, r_j, t_T)$ is the Green's function, i.e., spatial impulse response, diverging from location $r_j$ at time $t_T$ to location r at time t for the wave equation in the inhomogeneous medium. Since an impulse cannot be emitted in practice, the emission of a band-limited pulse $p(t)$ is considered. The transmitted field at location r in this case can then be expressed as a superposition in the form $$\int p(t_T) \psi_T(r,t,r_T,t_T) dt_T.$$

Assume next that the Born approximation is valid and that the distribution of medium variations is $\eta(r)$. The medium variations can be written explicitly in terms of the variations in sound speed and density or, equivalently, in terms of medium variations in compressibility and density. Each of these descriptions includes a factor that is the cosine of the scattering angle, i.e., the angle between the direction of the incident field propagation and the direction to the position of reception in the aperture from the focus. However, since this cosine factor is approximately unity in the backscatter configuration considered here for imaging, no further decomposition is needed for the present objective.

The term that contains the medium variations in the time-dependent wave equation can be considered to be a source on the right side of the equation. Use of the Born approximation and the assumed form of the medium variations then permits the scattered field to be written as the operator $[\eta(r)/c^2]\partial^2/\partial^2 t$ applied to the transmit field. In this operator, c is the average sound speed in the medium. The location r then acts as a virtual source that at time t has amplitude $$\eta(r)\frac{1}{c^2}\frac{\partial^2}{\partial^2 t}\Big[\int p(t_T)\psi_T(r, t, r_T, t_T)dt_T\Big].$$

The source produces at aperture location $r_R$ and time $t_R$ the response $$\psi_R(r, t, r_R, t_R)\eta(r)\frac{1}{c^2}\frac{\partial^2}{\partial^2 t}\Big[\int p(t_T)\psi_T(r, t, r_T, t_T)dt_T\Big]$$

in which $\psi_R(r, t, r_R, t_R)$ is the receive sensitivity pattern at location $r_R$ and time $t_R$ to an impulse at location r and time t. Writing this receive sensitivity pattern in a form corresponding to the form of the transmit field $\psi_T$ yields $$\psi_R(r, t, r_R, t_R) = \sum_j B_j G(r_j, t_R - \tau_j, r, t), \quad (2)$$

where $B_j$ and $\tau_j$ are weights and delays, respectively, at aperture locations $\{r_j\}$, $j=1, 2, \ldots$ and $G(r_j, t_R, r, t)$ is the inhomogeneous medium Green's function diverging from location r at time t to location $r_j$ at time $t_R$.

The complete response of the receive array to the scattered signals can be expressed as a summation of these virtual sources or echoes over all locations and all time. This response can be written $$y(t_R, r_R, r_T) = \quad (3)$$
$$\int\int \psi_R(r, t, r_R, t_R)\eta(r)\frac{1}{c^2}\frac{\partial^2}{\partial^2 t}\Big[\int p(t_T)\psi_T(r, t, r_T, t_T)dt_T\Big]dt d^3r.$$

Since the signal is observed in practice only during a finite time interval, a window $w(t_R)$ is applied to $y(t_R, r_R, r_T, t_T)$. The temporal-frequency spectrum of the windowed signal can then be expressed $$y(\omega, r_R, r_T) = \int\int\Big[\int w(t_R)\psi_R(r, t, r_R, t_R)e^{-i\omega t_R}dt_R\Big] \times \quad (4)$$
$$\eta(r)\frac{1}{c^2}\frac{\partial^2}{\partial^2 t}\Big[\int p(t_T)\psi_T(r, t, r_T, t_T)dt_T\Big]dt d^3r.$$

To identify aberration as a specific term, assume the medium variations do not change with time. The result is that the Greens functions depend only on the difference of their two time arguments and can be written $$G(r_1, t_1, r_0, t_0) = G(r_1, r_0, t_1 - t_0).$$

The aberration term $a(r_1, r_0, t)$ for a given $r_0, r_1$ is defined to be the convolutional factor that converts the Green's function $G_0(r_1, t_1, r_0, t_0)$ for the homogeneous medium into the Green's function for the inhomogeneous medium, i.e., $$G(r_1, r_0, \cdot) = \alpha(r_1, r_0, \cdot) * G_0(r_1, r_0, \cdot), \quad (5)$$

where the · (centered dot) refers to the variable in the convolution and the Green's function for the homogeneous medium also depends on the difference of the two time arguments. That Green's function has the form $$G_0(r_1, t_1, r_0, t_0) = G_0(r_1, r_0, t_1 - t_0) = \frac{\delta(t_1 - t_0 - \|r_1 - r_0\|/c)}{\|r_1 - r_0\|}.$$

Although, in general, two arbitrary functions will not differ by a convolutional factor, in this case, since $G_0(r_1, r_0, t)$ is a scaled δ-function, the $\alpha(r_1, r_0, t)$ factor is simply a scaled and shifted replica of $G(r_1, r_0, t)$. Incorporating Eq. (5) in Eq. (1) and Eq. (2) then gives $$\psi_T(r, t, r_T, t_T) = \sum_i A_i[\alpha(r, r_i, \cdot) * G_0(r, r_i, \cdot)](t - t_T + \tau_i) \quad (6)$$

$$\psi_R(r, t, r_R, t_R) = \sum_j B_j[\alpha(r, r_j, \cdot) * G_0(r, r_j, \cdot)](t_R - t + \tau_j) \quad (7)$$

in which spatial reciprocity has been used to infer that the order of the spatial arguments in both $\alpha$ and $G_0$ does not matter.

The transmit field can be concentrated in the vicinity of a focal point c by choosing the time shifts $\{\tau_i\}$, $i=1, 2, \ldots$ so that they cancel the $\|r-r_i\|/c$ terms when $r=c$, i.e., by choosing $\tau_i = \|c - r_i\|/c$. In this case, $$\psi_T(r, t, r_T, t_T, c) = \sum_i A_i \frac{\alpha(r, r_i, t - t_T + \|c - r_i\|/c - \|r - r_i\|/c)}{\|r - r_i\|},$$

where the argument c has been included on the left to indicate the dependence of the transmit field on the geometric focal point. This sum is coherent only in the neighborhood of the focal point at which the pulses are time aligned. In this neighborhood, the approximation $$\|c - r_i\| - \|r - r_i\| \approx -u_i \cdot (r - c),$$

where $$u_i = \frac{c - r_i}{\|c - r_i\|},$$

can be used to obtain $$\varphi_T(r, t, r_T, t_T, c) = \sum_i A_i \frac{\alpha(r, r_i, t - t_T - u_i \cdot (r - c)/c)}{\|r - r_i\|}.$$

The transmit field can also be represented as a sum of temporal-frequency harmonics by taking the temporal Fourier transform of the aberration time response. The result can be written $$\psi_T(r, t, r_T, t_T, c) = \int \left[ \sum_i A_i \frac{\alpha(r, r_i, \omega_T) e^{-ik_T u_i \cdot (r-c)}}{\|r - r_i\|} \right] e^{i\omega_T(t - t_T)} d\omega_T, \quad (8)$$

where the wavenumber $k_T = \omega_T/c$. The integrand can then be factored into the product of a monochromatic plane wave and a frequency-dependent complex envelope to obtain $$\psi_T(r, t, r_T, t_T, c) = \int \Psi_T(r, r_T, \omega_T, c) e^{-ik_T u_T \cdot (r-c)} e^{i\omega_T(t-t_T)} d\omega_T,$$

where $$\Psi_T(r, r_T, \omega_T, c) = \sum_i A_i \frac{\alpha(r, r_i, \omega_T) e^{-ik_T(u_i - u_T) \cdot (r-c)}}{\|r - r_i\|}, \quad (9)$$

$$r_T = \langle r_i \rangle_i,$$

and $$u_T = \frac{r_T - c}{\|r_T - c\|}.$$

The same concepts apply also to reception. If signals received from an array of elements at locations $\{r_j\}$, j=1, 2, . . . are each assigned a time shift $\tau_j = \|c - r_j\|/c$, then the temporal-frequency decomposition of the receive sensitivity pattern is $$\psi_R(r, t, r_R, t_R, c) = \quad (10)$$

$$\int \left[ \sum_j B_j \frac{\alpha(r, r_j, \omega_R) e^{-ik_R u_j \cdot (r-c)}}{\|r - r_j\|} \right] e^{i\omega_R(t_R - t)} d\omega_R,$$

where the argument c has been included on the left to indicate the dependence of the receive sensitivity pattern on the geometric focal point. That result can be expressed $$\psi_R(r, t, r_R, t_R, c) = \int \Psi_R(r, r_R, \omega_R, c) e^{-ik_R u_R \cdot (r-c)} e^{i\omega_R(t_R - t)} d\omega_R, \quad (11)$$

where $$\Psi_R(r, r_R, \omega, c) = \sum_j B_j \frac{\alpha(r, r_j, \omega_R) e^{-ik_R(u_j - u_R) \cdot (r-c)}}{\|r - r_j\|}.$$

$$r_R = \langle r_j \rangle_j,$$

$$u_R = \frac{r_R - c}{\|r_R - c\|},$$

and the wavenumber $k_R = \omega_R/c$.

Substitution of Eq. (8) and Eq. (10) into Eq. (4) for the spectrum of the received signal and evaluation of the integrations over $t_T$, $t_R$, $\omega_T$ and $\omega_R$ by using the assumptions that the window w is sufficiently long and the transmit envelope varies slowly with frequency yield $$y(\omega, r_R, r_T, c) = \quad (12)$$

$$-k^2 \int \eta(r) \sum_{i,j} A_i \frac{\alpha(r, r_i, \omega) e^{-iku_i \cdot (r-c)}}{\|r - r_i\|} B_j \frac{\alpha(r, r_j, \omega) e^{-iku_j \cdot (r-c)}}{\|r - r_j\|} \times$$

$$\int p(t - u_i \cdot (r-c)/c) w(t + u_j \cdot (r-c)/c) e^{-i\omega t} dt d^3 r,$$

where $k = \omega/c$. Next, assume the window w is much smoother and much longer than p. The inner integral can then be evaluated by setting w equal to the constant $$w((u_i + u_j) \cdot (r-c)/c),$$

i.e., the value that w assumes when $$t = u_i \cdot (r-c)/c$$

and the argument of p is 0. The evaluation permits the expression in Eq. (12) for the spectrum of the received signal to be written $$y(\omega, r_R, r_T, c) =$$

$$-k^2 P(\omega) \int \eta(r) \sum_{i,j} A_i \frac{\alpha(r, r_i, \omega) e^{-iku_i \cdot (r-c)}}{\|r - r_i\|} B_j \frac{\alpha(r, r_j, \omega) e^{-iku_j \cdot (r-c)}}{\|r - r_j\|} \times$$

$$w((u_i + u_j) \cdot (r-c)/c) d^3 r.$$

Finally, using Eq. (9) and Eq. (11) for the envelope of $\Psi_T$ and $\Psi_R$, respectively, and, since w is smooth and non-oscillatory, making the approximation $$u_i - u_j \approx u_T - u_R$$

in the argument of w yield for the spectrum of the received waveform the expression $$y(\omega, r_R, r_T, c) = -k^2 P(\omega) \int \eta(r) \Psi_T(r, r_T, \omega, c) \quad (13)$$

$$\Psi_R(r, r_R, \omega, c) \times w((u_T + u_R) \cdot (r-c)/c) e^{ik(u_T+u_R)\cdot(r-c)} d^3 r.$$

That expression shows that the ω temporal-frequency component of the time-windowed receiver output in the presence of aberration is proportional to a three-dimensional Fourier transform in space. The differences between Eq. (13) and corresponding Fourier transform relations found in the literature are that the transmit and receive envelopes are for arrays of elements and that the transmit and receive envelopes include aberration caused by propagation through an inhomogeneous medium. The spatial function being transformed is the product of the medium variations, the transmit envelope, the receive envelope, and the window applied along the spatial direction of the vector k which is defined $$k = \frac{\omega}{c}(u_T + u_R)$$

and is the spatial frequency at which the Fourier transform is evaluated.

The three factors that multiply the medium variations and limit the scattering regions are illustrated in FIG. 1, which shows scattering volume weights relative to the transmit array 102 and the receive array 104. The scattering volume is defined by the product of the transmit field envelope $\Psi_T$, the receive sensitivity envelope $\Psi_R$, and the observation time window w. Since the transmit field and receive sensitivity patterns depend on temporal frequency and position in space, the size of the scattering volume varies with frequency and is not sharply delineated. The spatial-frequency vector k is the wavenumber k times the sum of the unit vector $u_T$ in the direction of the transmit beam and the unit vector $u_R$ in the direction of the receive sensitivity pattern.

If the medium variations that cause the aberration are situated closer to the transmit and receive apertures than to the scattering volume, then $\alpha(r,r_j,\cdot)$ varies slowly with r. For an element at position $r_j$ in the aperture, the result is a relatively large scattering region where the difference between $\alpha(r,r_j,\cdot)$ and $\alpha(c,r_j,\cdot)$ around c is inappreciable. This invariance of aberration also applies within a somewhat smaller region to every other element in both the transmit and receive arrays. Such a region is called the aberration isoplanatic patch or, more briefly, isoplanatic patch. If the medium variations causing the aberration are not too severe and are situated sufficiently close to the transmit and receive apertures, then the aberration factors α will vary slowly with r. In that section, the scattering volume surrounding the focal point c is assumed to be contained in an isoplanatic patch.

The result of the isoplanatic patch assumption is that the first argument of α can be eliminated so that Eq. (6) and Eq. (7) become $$\psi_T(r, t, r_T, t_T, c) = \sum_i A_i[\alpha(r_i, \cdot) * (G_0(r, r_i, \cdot)](t - t_T + \tau_i(c)) \quad (14)$$

and

-continued $$\psi_R(v, t, v_R, t_R, c) = \sum_j B_j[\alpha(r_j, \cdot) * G_0(r, r_j, \cdot)](t_R - t + \tau_j(c)), \quad (15)$$

respectively. Those expressions indicate that the effects of aberration on both transmission and reception can be characterized by a bank of linear filters, each of which is associated with an individual element in the transducer array. When Eq. (14) and Eq. (15) are decomposed into temporal harmonics, those filter temporal responses are converted into multiplicative frequency responses and Eq. (9) and Eq. (11) become $$\Psi_T = (r, r_T, \omega, c) = \sum_i \alpha(r_i, \omega) \frac{A_i e^{-ik(u_i - u_T)\cdot(r-c)}}{\|r - r_i\|} \text{ and} \quad (16)$$

$$\Psi_R = (r, r_R, \omega, c) = \sum_i \alpha(r_j, \omega) \frac{B_j e^{-ik(u_j - u_R)\cdot(r-c)}}{\|r - r_j\|}, \quad (17)$$

respectively.

Assume now that the receive arrays are much smaller than the transmit array. That permits simplification of the expression for the receive signal envelope and yields an expression that can be used to estimate the aberration response. Consider the ratio of the aberrated receive sensitivity envelope, i.e., Eq. (17), and the unaberrated receiver sensitivity envelope, i.e., Eq. (17) with α≡1. That ratio, which is $$\frac{\left[\sum_j \alpha(r_j, \omega) \frac{B_j e^{-ik(u_j - u_R)\cdot(r-c)}}{\|r - r_j\|}\right]}{\sum_j \frac{B_j e^{-ik(u_j - u_R)\cdot(r-c)}}{\|r - r_j\|}},$$

has the form of a weighted average over the array of receiver elements. The exponential factors in the ratio give the weights different phases as r shifts in the scattering volume. However, since $u_j$ and $u_r$ are unit vectors that point in nearly the same direction, the difference $u_j - u_r$ is nearly orthogonal to $u_r$ so the phase terms only change in response to changes in the off-axis components of r. Also, the field of the larger transmit array, which is pointed in almost the same direction as $u_R$, severely limits the range of r in off-axis directions. (See FIG. 1.) Those conditions allow the phase terms to be ignored when the receive array is sufficiently large and permit aberration factors for the receive array to be defined by the expression $$\alpha_R(r_R, \omega) \equiv \frac{\left[\sum_j \frac{B_j \alpha(r_j, \omega)}{\|c - r_j\|}\right]}{\sum_j \frac{B_j}{\|c - r_j\|}} \approx \frac{\left[\sum_j B_j \alpha(r_j, \omega)\right]}{\sum_j B_j}. \quad (18)$$

That factor relates the aberrated and unaberrated receiver envelopes by $$\Psi_R(r, r_R, \omega, c) = \alpha_R(r_R, \omega)\Psi_R^{(h)}(r, r_R, \omega, c), \tag{19}$$

where $\Psi_R^{(h)}$ is the receive sensitivity envelope in a homogeneous medium, i.e., the receive sensitivity envelope with $\alpha \equiv 1$ in Eq. (17). Substituting the right side of Eq. (19) into Eq. (13) results in the receive signal spectrum being given by $$y(\omega, r_R, r_T, c) = \tag{20}$$
$$-k^2 P(\omega)\alpha_R(r_R, \omega)\int \eta(r)\psi_T(r, r_T, \omega, c)\psi_R^{(h)}(r, r_R, \omega, c) \times$$
$$\omega((u_T + u_R)\cdot(r-c)/c)e^{ik(u_T + u_R)(r-c)}d^3r.$$

The presence of the receiver aberration factor as a multiplicative term outside the integral in Eq. (20) permits the estimation of aberration.

The expression for subaperture signal spectra given by Eq. (20) cannot be used directly to isolate aberration because the equation contains the unknown random term $\eta(r)$. However, that term can be eliminated by forming spectral estimates that are averages of measurements from a number of different focal centers $$c_v = c + \delta c_v, v = 1,2,$$

located in a volume where the transmit envelope $\Psi_T$ (r, $r_T$, $\omega$, c) and the receive envelope $\Psi_R$ (r, $r_R$, $\omega$, c) are essentially invariant when r and c are simultaneously translated by the $\delta c_v$ offsets. That requirement is equivalent to the assumption that the scattering volumes for all the focuses reside within the isoplanatic patch and requires a larger isoplanatic patch than for a single focal volume. However, when that stronger condition is satisfied, the signal received from the scattering volume around the focal center $$c_v = c + \delta c_v$$

can be written $$y(\omega, r_R, r_T, c_v) =$$
$$-k^2 P(\omega)\alpha_R(r_R, \omega)\int \eta(r+\delta c_v)\psi_T(r, r_T, \omega, c)\psi_R^{(h)}(r, r_R, \omega, c) \times$$
$$\omega((u_T + u_R)\cdot(r-c)/c)e^{ik(u_T+u_R)(r-c)}d^3r.$$

That result shows that only the sample function of the scattering medium varies from one focus to the next.

Suppose now that two measurements are made and that the second measurement is identical to the first in every respect except that the receiver array is translated by the displacement $\delta r_R$. As a consequence of that shift, the receiver axis vector is also perturbed, i.e., $u_R \rightarrow u_R + \delta u_R$. The resulting expression for the signal after the shift is $$y(\omega, r_R, \delta r_R, r_T, c_v) = -k^2 P(\omega)\alpha_R(r_R + \delta r_R, \omega) \times$$
$$\int \eta(r+\delta c_v)\Psi_T(r, r_T, \omega, c)\Psi_R^{(h)}(r, r_R + \delta r_R, \omega, c) \times$$
$$\omega((u_T + u_R + \delta u_R)\cdot(r-c)/c)e^{ik(u_T + u_R + \delta u_R)(r-c)}d^3r.$$

The cross spectrum can be estimated by forming products of such paired measurements in which the initial measurement of each pair is conjugated and by averaging the products over the set of focuses. That average can be expressed $$\langle y(\omega, r_R, \delta r_R, r_T, c_v)\overline{y(\omega, r_R, r_T, c_v)}\rangle_v =$$
$$k^4|P(\omega)|^2\alpha_R(r_R + \delta r_R, \omega)\overline{\alpha_R(r_R, \omega)} \times$$
$$\int\int \langle \eta(r_1 + \delta c_v)\eta(r_2 + \delta c_v)\rangle_v \times \Psi_T(r_1, r_T, \omega, c)\overline{\Psi_T(r_2, r_T, \omega, c)} \times$$
$$\Psi_R^{(h)}(r_1, r_R + \delta r_R, \omega, c) \times \overline{\Psi_R^{(h)}(r_2, r_R, \omega, c)} \times$$
$$\omega((u_T + u_R + \delta u_R)\cdot(r_1 - c)/c) \times \omega((u_T + u_R)\cdot(r_2 - c)/c) \times$$
$$e^{ik(u_T + u_R + \delta u_R)(r_1 - c)/c} \times e^{-ik(u_T + u_R)(r_2 - c)/c} \times d^3r_1 d^3r_2.$$

in which the average over the focuses is denoted by $\langle \cdot \rangle_v$. To simplify the double integral, assume the medium is wide-sense statistically stationary and has a short correlation length so that $$\langle \eta(r_1)\eta(r_2)\rangle \approx \sigma^2\delta(r_2 - r_1),$$

where $\sigma^2$ is the spatial power density of the medium variations. That assumption is applicable, for example, if the scattering medium is composed of independently distributed scatterers whose sizes are much smaller than the volume determined by the transmit and receive envelopes and is true for the scattering medium used to mimic scattering by human liver. Also, assume the $\delta r_R$ and $\delta u_R$ perturbations appearing in the arguments of $\Psi_R^{(h)}$ and w, respectively, are inconsequential. The result of those assumptions is that the cross-spectral estimate becomes $$\langle y(\omega, r_R + \delta r_R, r_T, c_v)\overline{y(\omega, r_R, r_T, c_v)}\rangle_v = \tag{21}$$
$$k^4\sigma^2|P(\omega)|^2\alpha_R(r_R + \delta r_R, \omega)\overline{\alpha_R(r_R, \omega)} \times \int |\Psi_T(r, r_T, \omega, c)|^2$$
$$|\Psi_R^{(h)}(r, r_R, \omega, c)|^2 \times \omega^2((u_T + u_R)\cdot(r-c)/c) \times e^{ik\delta u_R \cdot (r-c)}d^3r.$$

The product of the three positive terms in the integrand is a spatial function of the measurement geometry (including transmit aberration). If the spatial function is denoted $\Omega(r-c, r_T, r_R, \omega, c)$ and considered as a function of r−c, then the integral is a spatial three-dimensional Fourier transform of $\Omega$ evaluated at spatial frequency $k\delta u_R$. This Fourier transform is denoted $\hat{\Omega}$ ($k\delta u_R, r_T, r_R, \omega, c$) for convenient reference. Equating the phases of both sides of Eq. (21) gives $$\text{Phase}[\langle y(\omega, r_R + \delta r_R, r_T, c_v)\overline{y(\omega, r_R, r_T, c_v)}\rangle_v = \tag{22}$$
$$\text{Phase}[\alpha_R(r_R + \delta r_R, \omega)] - \text{Phase}[\alpha_R(r_R, \omega)] +$$
$$\text{Phase}[\hat{\Omega}(-k\delta u_R, r_T, r_R, \omega, c)].$$

In that expression, the form of the $\hat{\Omega}$ term is different from the form of a corresponding term in an expression obtained in Ref [?] by considering only a single receive element and using more restrictive assumptions. However, since the $\hat{\Omega}$ term in Eq. (22) vanishes as $\delta u_R \rightarrow 0$, Eq. (22) provides a potential means to obtain phase differences of the aberration factors at neighboring positions in the receive array.

The magnitude of the aberration frequency response can be found from a normalization of the receive signal power spectrum at the individual array elements. This power spectrum is a special case of the cross spectrum given by Eq. (21). The special case is obtained by setting $\delta r_R = \delta u_R = 0$ and assuming the receiver consists of a single element at location $r_j$ in the array. Then, Eq. (21) becomes $$\langle |y(\omega, r_j, r_T, c_v)|^2 \rangle_v = k^4 \sigma^2 |P(\omega)|^2 |\alpha(r_j, \omega)|^2 \times$$
$$\int |\Psi_r(r, r_T, \omega, c)|^2 \frac{1}{\|r - r_j\|^2} \omega^2 ((u_T + u_R) \cdot (r - c)/c) d^3 r.$$

That expression can be simplified by assuming $\|r - r_j\| \approx \|c - r_j\|$ in the denominator and assuming $u_t \approx u_T$ in the argument of $w^2$ in the numerator. The result is $$\langle |y(\omega, r_j, r_T, c_v)|^2 \rangle_v = k^4 \sigma^2 |P(\omega)|^2 |\alpha(r_j, \omega)|^2 \frac{1}{\|c - r_j\|^2} \times \quad (23)$$
$$\int |\Psi_r(r, r_T, \omega, c)|^2 \omega^2 (2 u_T \cdot (r - c)/c) d^3 r.$$

Separating the integral on the right side into transverse and axial components permits the integration to be written $$I(\omega, r_j) = \int \left[ \int |\tilde{\Psi}_T(z u_T + r_\perp, r_T, \omega, c)|^2 d^2 r_\perp \right] w^2 (2(z - \|c\|)) dz.$$

Since the integral in square brackets is the energy in the transmit field at frequency $\omega$ in the plane transverse to the array axis at a distance z from the center of the array, that integration is denoted $E(\omega, z)$. Also, since that energy is nearly constant over the interval of z values where w is appreciable, the integral factor $I(\omega, r_j)$ can be expressed $$I(\omega, r_j) = C_w E(\omega, \|c\|),$$

where $C_w$ is the value of the integration over the square of the window in the z direction and the argument z in E has been replaced by the focus position c.

Further progress requires knowledge about the loss of energy. That loss cannot be estimated from the measured spectra because their fluctuations represent a redistribution as well as a loss of energy and the two effects are not separable without additional information. Reasonable assumptions are that the loss at each frequency is proportional to the emitted energy and that frequency dependency of the loss is an exponential decay with the exponent being linearly dependent on frequency over the band of interest. Then, $$E(\omega, \|c\|) = \gamma e^{-\delta |\omega|} \sum_i |A_i|^2,$$

where $\gamma e^{-\beta |\omega|}$ is the fraction of energy remaining in the z plane in a homogeneous absorbing medium. Substitution of that equation into the equation for $I(\omega, r_j)$ and then substitution of the resulting equation for $I(\omega, r_j)$ into Eq (23) yield $$\langle |y(\omega, r_j, r_T, c_v)|^2 \rangle_v = \frac{k^4 \sigma^2 |P(\omega)|^2 \gamma e^{-\beta |\omega|} \sum_i |A_i|^2}{\|c - r_j\|^2} |\alpha(r_j, \omega)|^2. \quad (24)$$

Equation (24) can be written compactly by using the factor $|H_j(\omega)|^2$, which is defined as $$|H_j(\omega)|^2 = \frac{k^4 \sigma^2 |P(\omega)|^2 \gamma e^{-\beta |\omega|} \sum_i |A_i|^2}{\|c - r_j\|^2} \quad (25)$$

in which the dependence of the position $r_j$ comes only from geometry. That expression, called here the system power response, has a form that is different from the form of a corresponding expression obtained in the prior art by assuming a lossless medium and using the assumption that the transmit focal plane energy $E(\omega, \|c\|)$ is proportional to the receive energy rather than to the emitted energy.

Using Eq. (25), Eq. (24) for the power spectrum at receive element location $r_j$ becomes $$\langle |y(\omega, r_j, r_T, c_v)|^2 \rangle_v = |H_j(\omega)|^2 |\alpha(r_j, \omega)|^2$$

in which the factor $H_j$ defined by Eq. (25) plays the same role as the system response in the relation for the output spectral power of a linear time-invariant system. The magnitude of the aberration can then be expressed as $$|\alpha(r_j, \omega)| = \frac{[\langle |y(\omega, r_j, r_T, c_v)|^2 \rangle_v]^{1/2}}{|H_j(\omega)|}. \quad (26)$$

Both the numerator and the denominator on the right side of that equation can be estimated from measurements up to the frequency-independent constant $\sigma^2$ by computations that are described below. Thus, Eq. (26) can be used to recover the magnitude of the aberration as a function of frequency in the band of the received signal.

While Eq. (26) gives the aberration magnitude explicitly, the recovery of aberration phase from Eq. (22) requires further processing. That is because only phase differences are available from Eq. (22) and because Eq. (22) can only be employed effectively when the phase contribution from $\hat{\Omega}$ ($k \delta u_R$, $r_T$, $r_R$, $\omega$, c) is negligible. However, the phase of $\hat{\Omega}$ can be made small by localizing the scattering volume in the $\delta u_R$ direction. Since the scattering volume is defined by $\Omega$, which is a product including the receive envelope as a factor, the required localization can be accomplished by using a receive subaperture that extends over a number of array elements. (See Eq. (13) and FIG. 1.) Elimination of the phase contribution from $\hat{\Omega}$ permits the angles of subaperture signal cross spectra to be used for phase differences between the aberration factors of neighboring subapertures. A least-mean-square-error calculation can then be used to reconstruct the phases of subaperture aberration factors from their differences. That entire procedure is incorporated in a recursion which recovers the aberration phase at the individual array elements from the phase of the subaperture aberration factors, as described below.

Although the recovery of the aberration phase uses a large rectangular array of elements to transmit and small rectangular arrays comprising subapertures to receive, separate measurements for every subaperture are not necessary. The measurement from each receive subaperture can be found by summing spectra from the contributing elements with appropriate weights. For notational convenience, that relation is expressed $$y_R(n, m, \omega, c) = \sum_{i,j} B(i, j) y(n + i, m + j, \omega, c). \quad (27)$$

where aperture location $r_j$ is defined by two spatial indices $(n, m)$, $y_R(n, m, \omega, c)$ is the $\omega$ temporal-frequency component of the signal received at the subaperture centered at array indices $(n, m)$, $y(n+i, m+j, \omega, c)$ is the w temporal-frequency component of the signal received at the element with array indices $(n+i, m+j)$, and $B(i, j)$ is the weight applied to the subaperture array element offset from the center of the aperture by $i, j$.

Using that notation, Eq. (18) for the aberration factor $\alpha_R$ at receive subaperture location $r_j$ becomes $$\alpha_R(n, m, \omega) = \frac{\left[\sum_{i,j} B(i, j)\alpha(n + i, m + j, \omega)\right]}{\sum_{i,j} B(i, j)}, \quad (28)$$

where $\alpha_R(n, m, \omega)$ is the aberration factor for the receive subaperture centered at $(n, m)$ and a $(n+i, m+j, \omega)$ is the aberration factor at array element $(n+i, m+j)$. That equation links the aberration phase at a receive subaperture to the aberration phase at the individual elements in the subaperture. By letting $$\theta_R(n,m,\omega)=\text{Phase}[\alpha_R(n,m,\omega)]$$

and $$\theta(n+i,m+j,\omega)=\text{Phase}[\alpha(n+i,m+j,\omega)],$$

Eq. (28) can be rewritten $$|\alpha_R(n, m, \omega)|e^{i\theta_R(n,m,\omega)} = \frac{\left[\sum_{i,j} B(i, j)|\alpha(n + i, \omega + j, \omega)|e^{i\theta(n+i,m+j,\omega)}\right]}{\sum_{i,j} B(i, j)}.$$

If small-angle approximations apply, then $$\theta_R(n, m, \omega) = \sum_{i,j} \frac{B(i, j)|\alpha(n + i, m + j, \omega)|}{\sum_{k,l} B(k, l)|\alpha(n + k, m + l, \omega)|} \theta(n + i, m + j, \omega). \quad (29)$$

Although that approximation may be crude in early iterations, it becomes progressively more accurate as the phase estimates converge.

Equation (29) indicates that $\theta_R(n, m, \omega)$ is a weighted average of $\theta$ values within the subaperture centered at $(n,m)$ but with different weights at each center. Thus, Eq. (29) can be written in the form of a linear matrix transformation as $$\theta_R(\omega)=S(\omega)\theta(\omega). \quad (30)$$

In that expression, $\theta_R(\omega)$ is a column vector of receive subaperture phases, $S(\omega)$ is a linear smoothing operator (but not a convolution), and $\theta(\omega)$ is a column vector of receive element phases.

The aberration phase $\theta(\omega)$ at the individual elements of the array can be reconstructed from subaperture measurements by a recursion based on Eq. (30). Each iteration uses Eq. (21) to reconstruct the subaperture phase factors $\theta_R(\omega)$ from the phase of the subaperture cross spectra. In the j-th step of the recursion, an estimate $$\theta^{(j)}(\omega)=\{\theta^{(j)}(n,m,\omega)\}_{n,m}$$

of the phase vector $\theta(\omega)$ is used to compensate the effects of aberration by multiplying the frequency components of the signals at the array elements by the compensation factors $e^{-i\theta^{(j)}(n,m,\omega)}$. That multiplication replaces the original signals by new signals that have been aberrated by the partially corrected factors $\alpha(n, m, \omega) e^{-i\theta^{(j)}(n,m,\omega)}$. New subaperture measurements are formed from those corrected signals by using Eq. (27) and a least-mean-square-error reconstruction procedure described below is applied to extract the corrected subaperture aberration factor phases $\theta_R^{(j)}(\omega)$. Using Eq. (30), those phase factors can be expressed as $$\theta_R^{(j)}(\omega)=S(\omega)[\theta(\omega)-\theta^{(j)}(\omega)].$$

If $S(\omega)$ is a positive matrix, an improved estimate may be obtained by setting $$\theta^{(j+1)}(\omega)=\theta^{(j)}(\omega)+\zeta\theta_R^{(j)}(\omega) \quad (31)$$

in which $\zeta$ is a positive parameter. The recursion is conveniently started using $\theta^{(0)}(\omega)=0$ and can be shown to converge for $\zeta<\|S(\omega)\|^{-1}$.

The least-mean-square-error calculation of subaperture aberration phase $\theta_R(n, m, \omega)$ from phase differences uses cross-spectral estimates formed by offsetting the receive subaperture arrays a unit step along one Cartesian dimension of the aperture while the other Cartesian coordinate is fixed and vice versa. The defining relations for these phases are $$d_1(\omega,n,m)=\text{Phase}[\langle y_R(\omega,n+1,m)\overline{y_R(\omega,n,m)}\rangle_v] \quad (32)$$

and $$d_2(\omega,n,m)=\text{Phase}[\langle y_R(\omega,n+1,m)\overline{y_R(\omega,n,m)}\rangle_v] \quad (32)$$

Using Eq. (22) and assuming the phase of $\hat{\Omega}$ term is negligible, the $d_1$ and $d_2$ terms can be identified directly with differences of the $\theta_R(n, m, \omega)$ phases to obtain $$\theta_R(n+1,m,w)-\theta_R(n,m,\omega)=d_1(n,m,\omega)$$

and $$\theta_R(n+1,m,\omega)-\theta_R(n,m,\omega)=d_2(n,m,\omega)$$

The $\theta_R(n, m, \omega)$ values can be obtained from those equations by a least-mean-square-error fit. That fit may be conveniently expressed in matrix form as $$\min_{\theta_R(\omega)} \left\| \begin{pmatrix} [\partial_1] \\ [\partial_2] \end{pmatrix} \theta_R(\omega) - \begin{pmatrix} d_1 \\ d_2 \end{pmatrix} \right\|^2 \quad (34)$$

in which $[\partial_i]$, $i=1, 2$ denotes a matrix that implements a two-point differentiation in the i-th direction. The solution can be found by standard techniques but a much more efficient method is available. The method is derived by writing the normal equations in the form $$\left([\partial_1]^2 \quad [\partial_2]^2\right)\begin{pmatrix} [\partial_1] \\ [\partial_2] \end{pmatrix}\theta_R(\omega) = \left([\partial_1]^2 \quad [\partial_2]^2\right)\begin{pmatrix} d_1 \\ d_2 \end{pmatrix}$$

and then recognizing the expression to be a statement of the discrete two-dimensional (Poisson) potential problem $$[\Delta_N]\theta_R(\omega) = [\nabla \cdot]\begin{pmatrix} d_1 \\ d_2 \end{pmatrix}, \qquad (35)$$

where $[\Delta_N]$ is the matrix for a discrete (five-point) Laplacian with Neumann boundary conditions and $[\nabla \cdot]$ is the matrix for a discrete (five-point) divergence operator. That problem can be efficiently solved by using either a fast discrete cosine transform or a fast Fourier transform to invert the Laplacian. Details of the solution are known to those skilled in the art and will therefore not be set forth in detail here.

An experimental configuration and procedure will now be disclosed. Measurements were made with a novel two-dimensional array system. The transducer array is planer and consists of 80×80 elements that span 48×48 mm² with a pitch of 0.6×0.6 mm². The system has a 3.0 MHz center frequency and a 56% fractional bandwidth. Transmit waveforms are individually programmable. Receive waveforms are sampled at a 20 MHz rate using 12-bit A/D conversion. The characteristics of the system permit imaging with an f-number of 1.2 to obtain an isotropic 6 dB (i.e., full width at half-maximum) two-way beamwidth of 0.70 mm.

Pulse-echo waveforms were acquired from a point reflector and from a random medium each through a water path and through an aberrator path. In every case, the signals originated from a focus that was sequentially placed at 75 different positions. The positions were defined by platonic figures, i.e., polyhedra that are inscribed in a sphere and have faces that are all congruent regular polygons. Three platonic figures were used: an inner icosahedron, a dodecahedron, and an outer icosahedron. Each had the same center. The two icosahedra were concentric, with one axis (i.e., a line joining antipodal vertices) being coincident with the axis of the transducer array. The dodecahedron was oriented so that its vertices were on the same rays (from the origin) as the face centers of the icosahedra. The 75 focal positions were comprised of the common center, the 12 vertices of the inner icosahedron, the 20 vertices of the dodecahedron, the 12 vertices of the outer icosahedron, and the midpoints of the 30 circular arcs that connect adjacent vertices of the outer icosahedron. From the common center, the distance to the vertices of the inner icosahedron, dodecahedron, and outer icosahedron were 0.79, 1.50, and 1.50 mm, respectively. That configuration was chosen to maximize the independence of the scattering volumes. Use of Platonic figures to position the centers produces symmetries that greatly simplify the minimization of overlap in given volume.

The point reflector was the rounded tip of a 0.82 mm diameter stainless steel rod positioned with its axis perpendicular to the plane of the two-dimensional array.

The random scattering medium was made by conventional techniques to mimic ultrasonic characteristics of human liver; at a temperature of 29.5° C. (the nominal temperature of the water in which the experiments were conducted), the medium has an average sound speed of 1.578 mm/μs and an average attenuation of 1.39 dB/cm at the system 3.0 MHz center frequency.

The aberrator was made to have first-order and second-order ultrasonic pulse distortion statistics like those of human abdominal wall. The phantom is 35 mm thick and has a background made from a tissue mimicking material. Spheres with 6.3 and 12.6 millimeter diameters and made of a similar material with a sound speed about 2% greater than that of the background are randomly distributed inside with a 15% volume fraction to produce the aberration. The full-width-at-half-maximum correlation length and the rms (root mean square) value of the arrival time fluctuations are 6.2 mm and 76.4 ns, respectively, and the corresponding quantities for the energy level fluctuations are 1.6 mm and 3.3 dB, respectively. Those statistics are at the high end of the range for corresponding statistics of abdominal wall measurements as well as breast measurements so the aberration produced by that phantom is considered severe.

Figure 2:
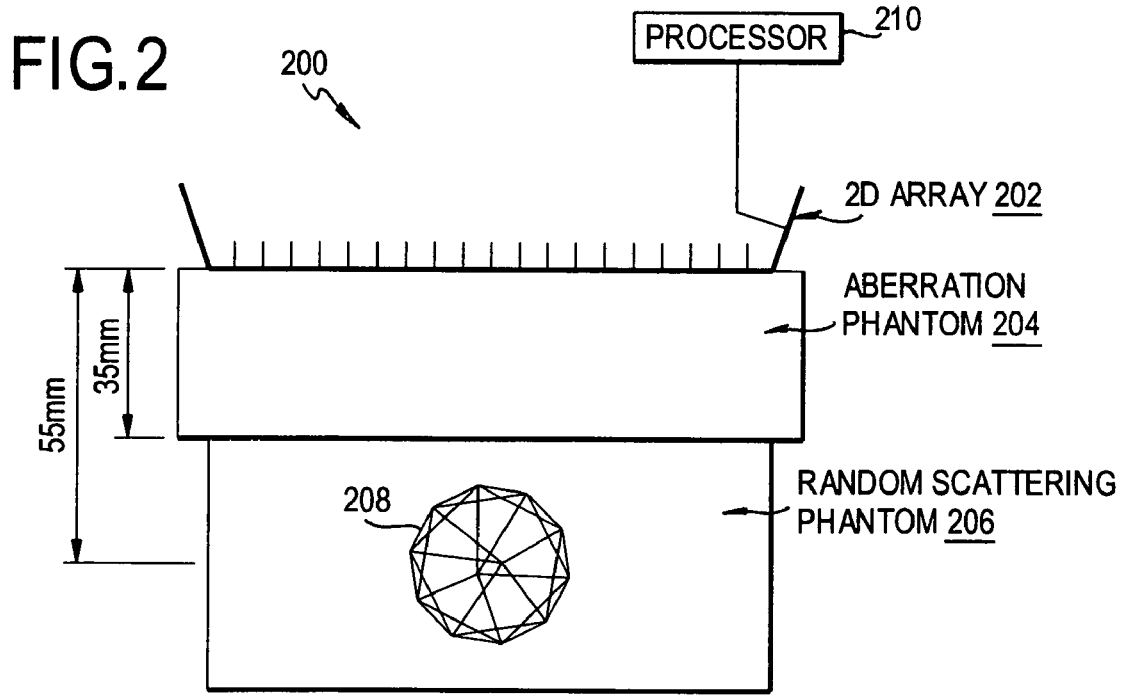
FIG. 2 is a schematic diagram showing an experimental configuration of the preferred embodiment.

A diagram of the experimental configuration showing the array 202, aberrator 204, random medium 206, and a conceptual drawing of an icosahedron 208 is in FIG. 2. Also shown in FIG. 2 is a processor 210 which receives signals form the array 202, performs the calculations disclosed herein and controls the operation of the array 202 to transmit the wave and to perform the aberration correction disclosed herein.

Waveforms were acquired from a liver-mimicking random scattering medium after two-way propagation through a phantom mimicking strong aberration produced by abdominal wall. The transmit focus was positioned within an isoplanatic volume at points defined using regular polyhedra. The random medium was replaced by a point reflector to obtain reference values of the aberration response and to measure pulse-echo resolution and by a hydrophone that was scanned to measure transmit beams. The aberration phantom was removed for water-path measurements.

The transmit aperture had 79×79 elements and was apodized by applying a one-dimensional Hamming window in each Cartesian direction of the array. The separation of the focuses was accomplished by geometrically focusing the transmit and receive beams at each point. Both transmit and receive f-numbers were 1.2 and the nominal focus, i.e., the center of the platonic figures, was 55 mm away from the array in all the measurements.

The basic transmit pulse s (t) in the preferred embodiment was the Gaussian bandpass function $$s(t) = A e^{-t^2/2\sigma_s^2} \sin(2\pi f_0 t)$$

in which the pulse length parameter ss was 0.208 μs, the center frequency $f_0$ was 3.0 MHz, and the amplitude scale factor A depended on the apodization of the element to which the pulse was applied.

To measure the transmit focus, the point reflector or scattering medium was removed from below the aberrator and the focus was scanned with a hydrophone capable of being moved in three orthogonal directions by stepper motors so that the focus can be measured in a volume. The lateral resolution of the transmit focus in the preferred embodiment, however, was measured along lines in the x and y spatial directions at the peak of the focus. The transmit axial resolution was measured using the transmit pulse waveform at the peak of the focus.

Measurements to determine the sensitivity that is produced by focusing on both transmit and receive were made using a point reflector. For the focus at the common center of the polyhedra, the reflector was positioned at increments along each of the three Cartesian dimensions, starting at the peak of the focus, with the other two coordinates kept fixed. That procedure maps the resolution of an imaging measurement that employs a combined transmit-receive focus and measures sensitivity to off-axis scatterers.

The computational procedure will now be disclosed: The data for a single experiment consist of 79×79×75 received waveforms. The first two dimensions in that waveform set span the elements of the transducer array and the last dimension spans the set of 75 focal points. A complete experiment is comprised of such sets that were determined by the choice of scattering object, the presence or absence of the aberrator, and the methods of transmit and receive beam formation.

Aberration responses determined from both the point-reflector and random-medium experiments were employed to compensate receive waveforms for focusing on receive. The responses were also employed to produce transmit waveforms that focused through the aberrator. In addition, time shifts were estimated from the point-reflector and random-medium waveforms to produce transmit and receive focuses that were time-shift compensated.

For each waveform in each experiment, a geometric delay was determined from the path length between the focal point and the array element and the waveform was shifted to remove that delay. After that correction for geometry, an 80-point (4 µs) segment of the waveform around the focus was extracted using a uniform window. The segment was zero-padded to 160 points and a 160-point fast Fourier transform was used to obtain the signal temporal harmonic amplitude given by Eq. (20). The harmonic amplitudes were then normalized using measured data for a water path to remove variation caused by element directivity and by difference in distance between position in the aperture and the geometric focus. A consequence of that is the removal of the position-dependent factor in $|H_j(\omega)|^2$ given by Eq. (25).

Since the only difference between the point-reflector waveforms acquired through the aberrator path and through the water path is the aberration that appears as a convolutional factor, the aberration factor was obtained by deconvolving the water path response, i.e., the system response, from the aberrator-path waveforms. That provided a reference for comparison with the aberration response found using statistical estimates calculated from random-medium waveforms. The deconvolution was performed in the frequency domain by assuming each aberration path response is described by the coefficients of a finite impulse response filter. Because the resulting system of equations is ill-conditioned, a Tikhonov regularization was employed to stabilize the inversion by modifying the matrix singular values $\lambda_i$, i=1, 2, . . . . The modification was $$\lambda_i \rightarrow \lambda_i + \xi^2/\lambda_i$$

in which $\xi$ was selected to be $0.10\lambda_{max}$, i.e., 20 dB below the maximum singular value.

The aberration response computed in that way using the point-reflector waveforms from the center of the set of focuses was considered to be the true aberration. Aberration responses were also computed in that way from waveforms with the point reflector located at the other focuses to confirm the assumption that the aberration to the same position in the aperture is essentially unchanged for each focus in the set. The aberration response from the center focus was used as the reference against which the aberration response determined from the random-medium waveforms was compared.

Estimation of the aberration from the random-medium experiments used theory developed above. The aberration frequency-domain magnitude and phase were found independently as outlined below. The magnitude and phase were then combined to obtain the complex amplitude of the aberration in the frequency-domain band of the computations. That band was 1.875-3.875 MHz for point-reflector waveforms and 1.875-4.00 MHz for random-medium waveforms.

The temporal-harmonic magnitude of the aberration response was computed using Eq. (26). In that equation, the factor $$k^4 \sigma^2 |P(\omega)|^2 \sum_i |A_i|^2$$

included in $|H_j(\omega)|^2$ given by Eq. (25) was obtained from averaging power spectra from 75 random medium scattering measurements with the aberrator removed, i.e., through a water path. Thus, $$\langle |y_{h2o}(\omega, r_j, r_T, c_v)|^2 \rangle_{v,j} = k^4 \sigma^2 |P(\omega)|^2 \sum_i |A_i|^2,$$

where the subscript h2o denotes a water path to the scattering phantom. Since the spatial power density $\sigma^2$ on the right side of that equation is the only factor that depends on the characteristics of the scattering medium, the system function can be evaluated up to an unimportant frequency-independent constant from laboratory measurements made with phantoms and then the system function can be used to obtain the magnitude of aberration during clinical measurements. In the preferred embodiment, the loss fraction $\gamma e^{-\beta|\beta\omega|}$ also included in $|H_j(\omega)|^2$ was obtained by averaging the power spectrum at each position in the aperture from each of the 75 focuses in the random medium with the aberrator present. Since that average includes energy loss during both transmit and receive, the loss fraction is given by $$\left[ \frac{\langle |y(\omega, r_j, r_T, c_v)|^2 \rangle_{v,j}}{\langle |y_{h2o}(\omega, r_j, r_T, c_v)|^2 \rangle_{v,j}} \right]^{1/2} = [\gamma e^{-\beta|\omega|} \langle |\alpha(\omega, r)|^2 \rangle_j]^{1/2} = \gamma e^{-\beta|\omega|}.$$

The magnitude of each aberration response was scaled by a frequency-independent factor that was the same for each element to make the average of all the aberration magnitudes equal to unity at the system center frequency (3.0 MHz).

The phase of the aberration frequency response was obtained using the recursion described above. A detailed description of the procedure is given below. In this description, the term $y(\omega, n, m, v)$ denotes the $\omega$ frequency component of the received signal at the (n, m)-th element of the array when the scattering focus is positioned at the v-th location and $\theta(\omega, n, m)$ denotes the current estimate for the phase of the aberration frequency response at the (n, m)-th element at frequency $\omega$. This estimate $\theta$ was initially set equal to 0 and then modified using the five-step procedure given below.

Step 1. The frequency components (spectra) of the received signals were corrected using the estimated phase, i.e., by forming the products $$y_c(\omega, n, m, v) = y(\omega, n, m, v) e^{-i\theta(\omega, n, m)}$$

for all usable frequencies, array elements, and focuses.

Step 2. Subaperture signal spectra were formed by convolving the array of corrected spectra with Gaussian weights, i.e., by performing the calculation $$y_R(\omega, n, m, v) = \sum_{\Delta n \Delta m} y_c(\omega, n + \Delta n, m + \Delta m, v) e^{-[(\Delta n)^2 + (\Delta m)^2]/(2\sigma_R^2)}.$$

in which $\sigma_R$ is the spatial standard deviation of the applied weights.

Step 3. Cross-spectral estimates from adjacent subapertures were calculated and their phases used for the difference between the phase of the aberration frequency responses at adjacent subapertures so that the estimates of the phase differences $d_1$ in Eq. (32) and $d_2$ in Eq. (33) are given by $$d_1(\omega, n, m) = \text{Phase}\left[\frac{1}{75}\sum_{v=1}^{75} y_R(\omega, n+1, m, v)\overline{y_R(\omega, n, m, v)}\right] \text{ and}$$

$$d_2(\omega, n, m) = \text{Phase}\left[\frac{1}{75}\sum_{v=1}^{75} y_R(\omega, n, m+1, v)\overline{y_R(\omega, n, m, v)}\right],$$

respectively.

Step 4. The phase of the subaperture aberration frequency response was found from the phase differences by solving the Poisson problem in the form of Eq. (35) to obtain a least-mean-square-error solution of Eq. (34).

Step 5. The phase estimate was then modified by setting $$\theta(\omega,n,m) = \theta(\omega,n,m) + \theta_R^c(\omega,n,m),$$

which is Eq. (31) with $\zeta=1$.

That procedure was repeated, e.g., 10 times, until normalized changes in compensated waveforms and, therefore, $\theta$ become inappreciable, e.g., less than 0.001. The convolution in Step 2 was implemented by forming the product of the two-dimensional Fourier transform of $y_c$ ($\omega$, n, m, v) and a two-dimensional Gaussian with a spatial-frequency standard deviation equal to 0.26 times the spatial Nyquist frequency and then taking the inverse transform of the product. That is equivalent to using receive subapertures that are formed by applying Gaussian weights with a standard deviation $\sigma_R$ of 1.23 times the separation between adjacent elements and results in an effective size of the receiver subapertures that is a small fraction of the dimensions of the transmit array.

Special precaution was taken to remove $2\pi$ wraps in the phase differences found from the cross spectra. The reason for that is that the phase differences tend to grow linearly with frequency and can assume values outside of the interval [$-\pi$, $\pi$] when $\omega$ approaches the upper portion of the system usable bandwidth. In order to assign the correct multiple of $2\pi$ to the phase differences, the least-mean-square-error reconstruction of $\theta_R^c$ ($\omega$, n, m) was computed separately for each frequency by starting at the lowest frequency and advancing frequency by frequency through the band. The $2\pi$ interval for each of the phase differences at frequency $\omega_{i+1}$ was anticipated from reconstructed phases (i.e., the values $\{\theta_R^c(\omega, n, m)\}$, n, m=1, 2, ..., 79) at frequency $\omega_i$ by assuming that $d_1$ ($\omega_{i+1}$, n, m) is contained in the $2\pi$ interval centered around $$\frac{\omega_{i+1}}{\omega_i}[\theta_R(\omega, n+1, m) - \theta_R(\omega, n, m)]$$

and that $d_2$ ($\omega_{i+1}$, n, m) is contained in the $2\pi$ interval centered around $$\frac{\omega_{i+1}}{\omega_i}[\theta_R(\omega, n, m+1) - \theta_R(\omega, n, m)].$$

To implement that precaution, Step 3 and Step 4 were performed iteratively starting at the lowest frequency and advancing frequency by frequency to the highest frequency.

Transmit and receive beams were compensated using the complex amplitude of the aberration in the frequency domain. To get so-called predistorted transmit waveforms that focus through the aberrator, the spectrum of the Gaussian shaped bandpass waveform used for uncompensated transmission was multiplied by the conjugate of the estimated complex amplitude of the aberration in the band of the estimate. That corresponds to using time reversal of the aberration temporal response. The phase of the Gaussian spectrum outside the measurement band was compensated using the phase from time shifts determined by a least-mean-square-error linear fit to the estimated aberration phase as a function of frequency. The magnitude of the Gaussian spectrum outside the measurement band was unchanged. From the resulting complex amplitudes, a time-domain transmit waveform was calculated using a frequency-domain regularized inversion in which the aberration was modeled as a finite impulse response filter. The regularization was the same as previously described. That approach, which does not assume the out-of-band frequency response of the aberration is zero, smooths discontinuities in phase and magnitude at the edges of the band. The predistorted waveforms were emitted and the waveforms from the focus were received. The received waveforms were compensated the same way as the transmit waveforms except that discontinuities at the band edges of the aberration estimate were smoothed using a cosine taper 0.200 MHz wide and an inverse Fourier transform was used to obtain time-domain waveforms from the compensated spectra. The resulting waveforms were beamformed conventionally by using a delay-and-sum operation.

The results will now be evaluated. A waveform similarity factor which can be viewed as an aggregate cross-correlation coefficient was used to quantify the similarity of the same geometrically corrected waveforms in the aperture before and after compensation.

Transmit and transmit-receive focuses before and after compensation were also examined to assess the performance of aberration estimation and correction. The transmit focus was measured with a hydrophone. The transmit-receive focus was measured by focusing both the transmit beam and the receiver sensitivity pattern at a point that was 55 mm axially from the center of the transducer array. A point reflector was then positioned at increments along each of the three Cartesian dimensions, starting at the focal point (with the other two coordinates kept fixed) and the signal was measured at each step. The envelope of that signal was used to describe the combined weights of the transmit and receive focuses at the corresponding positions of the reflector.

Quantitative descriptions of the transmit and transmit-receive focuses were obtained using effective widths and effective radius.

The calculation of each description starts with the envelope of the analytic signal at the focus. To define the effective width in a Cartesian dimension, a set of amplitudes is obtained by taking the maximum amplitude in a plane orthogonal to that dimension as the plane is incremented through the region of the focus. The amplitudes as a function of position in the dimension form a curve with a peak at the position of the focus. The effective width in the Cartesian dimension is the greatest distance between intercepts of that curve with a horizontal line as the line moves down from the peak. The effective radius is half the cube root of the product of the three effective widths as a function of level below the peak. Those two measures are plotted as the horizontal coordinate while the vertical coordinate is level below the peak because they describe a beam pattern and beam patterns are conventionally presented that way.

A ratio of intensity at the peak of the receive focus to the total received energy was calculated to describe the receive focus quantitatively. That ratio is called here the receive beamforming efficiency and can be shown to reach a maximum of 1.0 when beam formation uses time reversal. A corresponding ratio called the transmit beamforming efficiency was defined for a transmit focus by using a hydrophone measurement of the peak intensity in the plane of the transmit focus and using total energy applied to the transmit array in place of total energy in the transmit focal plane. The energy applied to the transmit array was employed because a direct measurement of the focal plane energy is limited by noise and is extraordinarily time consuming with the scanned hydrophone available for the experimental testing which was performed. Although the direct equivalence between receive beamforming efficiency and transmit beamforming efficiency that results from transmit and receive reciprocity is lost by that substitution when energy loss is different on transmit and receive and when the voltage-pressure conversion factor of the array is not known (as is the case in the reported experiments), the two efficiencies are related by a scale factor. The receive beamforming efficiency and the transmit beamforming efficiency were each normalized by the corresponding beamforming efficiency obtained by using time reversal of the aberration response determined from a point reflector to present the respective efficiencies on a scale relative to an ideal.

Figure 3:
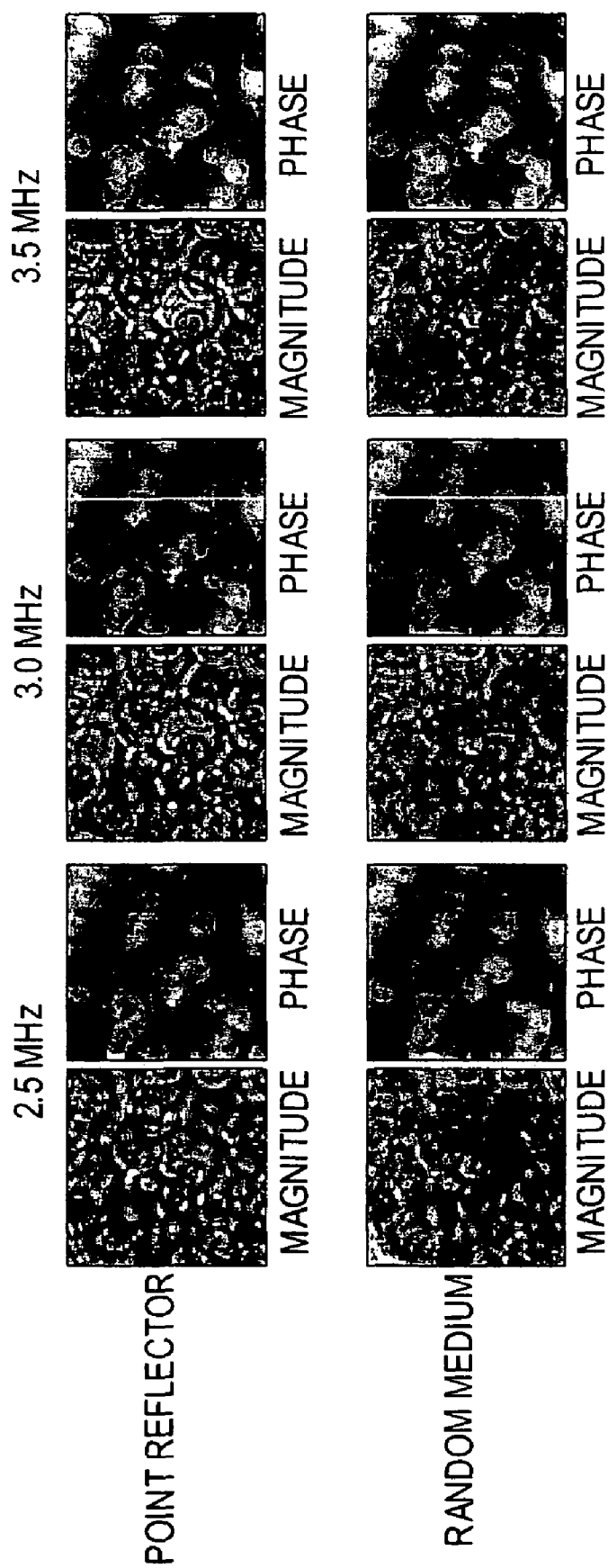
FIG. 3 is a set of plots of the representative magnitudes and phases of the aberrations estimated according to the preferred embodiment.

Representative magnitude and phase of aberration calculated from point-reflector and random-medium waveforms are presented in FIG. 3. The top row shows aberration calculated from point-reflector waveforms. The bottom row shows aberration determined statistically from random-medium waveforms. In each panel, the vertical and horizontal axes correspond to the row and column dimensions, respectively, of the 79×79 element (square) transducer array aperture. Magnitude is displayed on a linear grayscale spanning zero to twice the mean at each frequency. Phase is normalized by frequency to show path length variations and is displayed on a bipolar linear grayscale spanning ±0.350 mm.

The calculation of aberration from the point-reflector waveforms used the central focus. The calculation of aberration from the random-medium waveforms used 75 focuses and was statistically based. The waveforms from each focus in the statistical method were produced by a transmit beam compensated using a single set of time shifts estimated from geometrically focused random-medium illumination. Correlation of the aberration magnitude determined from the point-reflector with the aberration magnitude determined statistically yields a correlation coefficient of 0.944. The corresponding correlation coefficient for the aberration phase is 0.939.

Figure 4:
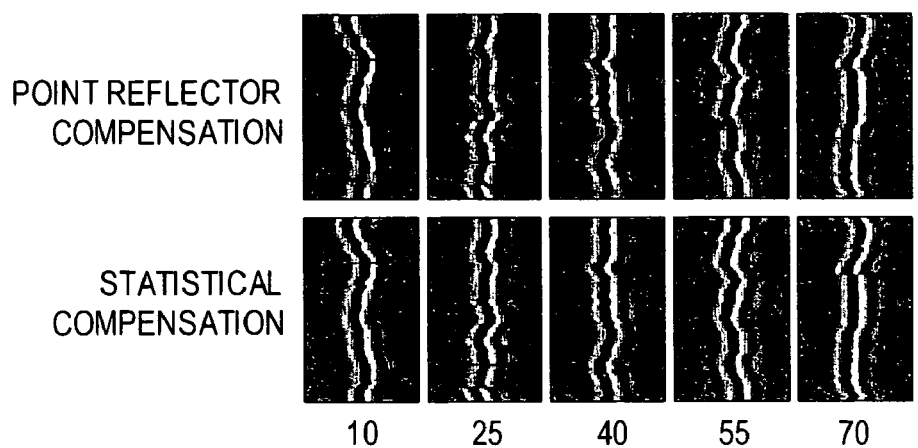
FIG. 4 is a set of plots showing illustrative compensated transmit waveforms.

Illustrative transmit waveforms compensated using time reversal of aberration responses are shown in FIG. 4. The top row shows compensation with aberration determined from point-reflector waveforms. The bottom row shows compensation with aberration determined statistically from random-medium waveforms. In each panel, the vertical axis spans 79 elements in the transducer array column designated by the number under the panel column and the horizontal axis spans 2 as of time. The amplitude of the waveforms is shown on a bipolar linear grayscale.

The compensation employed the aberration frequency-domain magnitude and phase shown in FIG. 3 for calculations using point-reflector and random-medium waveforms. Correlation of the transmit waveforms compensated using aberration determined from the point reflector with the transmit waveforms compensated using aberration determined statistically yields a correlation coefficient of 0.958.

Figure 5:
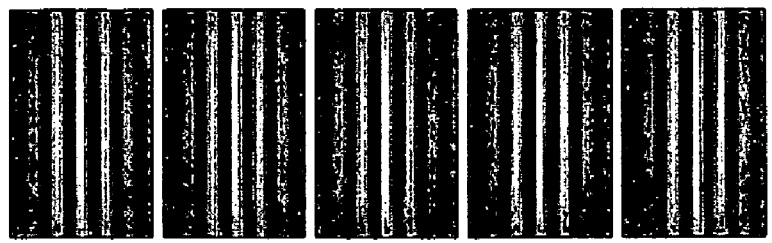
FIG. 5 is a set of plots showing representative phase corrected point-reflector and random-medium waveforms.
Figure 5:
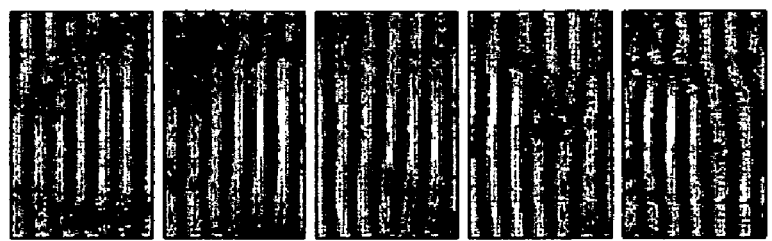
Figure 5:
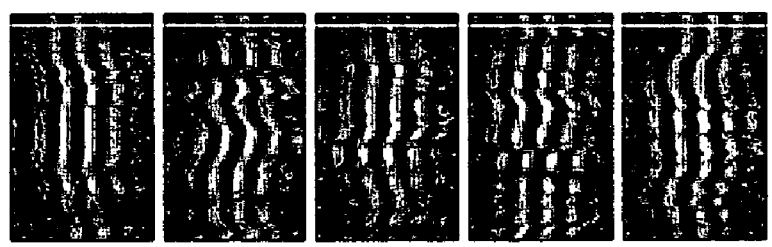
Figure 5:
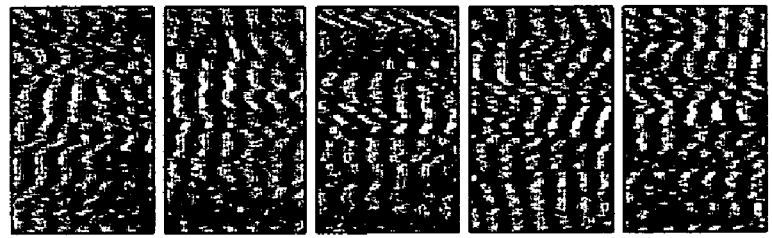
Figure 5:
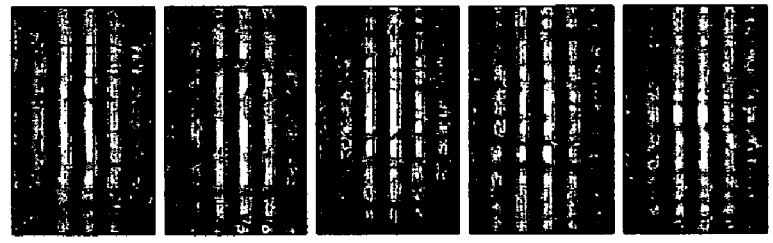
Figure 5:
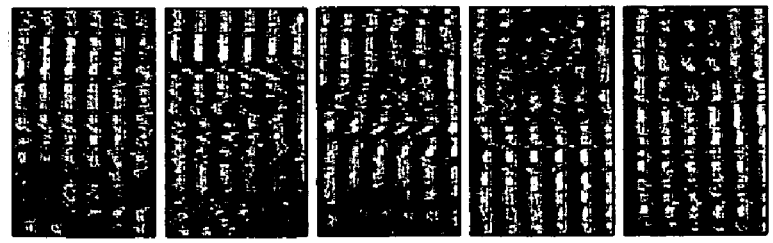

Representative geometrically corrected point-reflector and randommedium waveforms received through a water path and received through an aberrator path before and after phase compensation are presented in FIG. 5. In the upper two rows, waveforms received through a water path are shown. In the center two rows, waveforms received through an aberrator path are shown before compensation. In the lower two rows, the aberrator-path waveforms in the center two rows are shown after compensation by the total phase determined statistically from random-medium waveforms. In each panel, the vertical axis spans 79 elements in the transducer array column designated by the number under the panel column and the horizontal axis spans 2 µs of time. The amplitude of the waveforms is shown on a bipolar linear grayscale.

The aberrator path is the same as for FIG. 3. The compensation was statistically determined from waveforms produced by a time-shift-compensated transmit beam. The time-shift estimation used waveforms from geometrically focused random-medium illumination. Compensation increases the waveform similarity factor of the point-reflector and random-medium aberrator-path waveforms to 0.940 and 0.571 from 0.463 and 0.199, respectively, while the corresponding waveform similarity factor of point-reflector and random-medium water path waveforms is 0.993 and 0.591, respectively.

Figure 6:
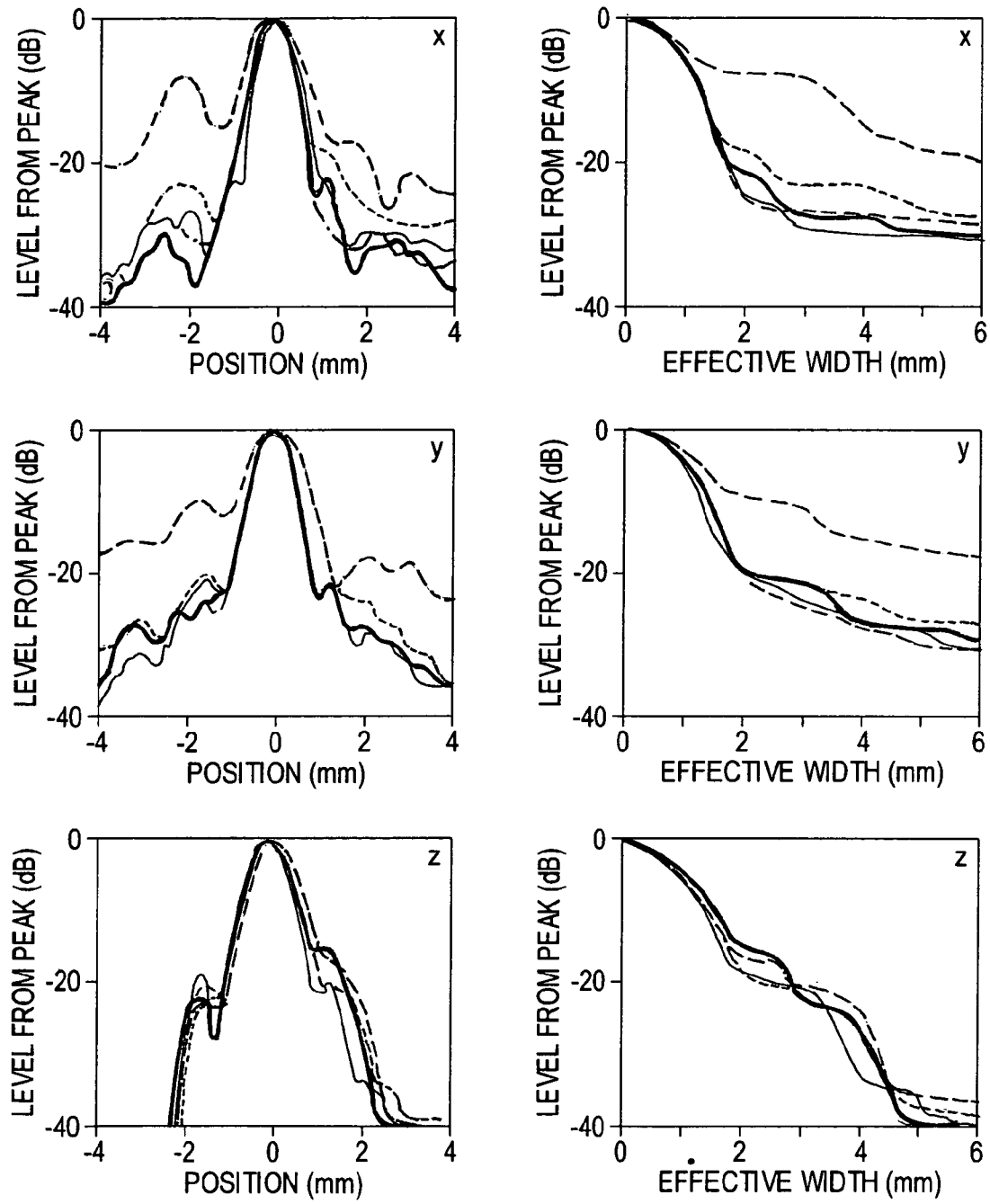
FIG. 6 is a set of plots showing a measured transmit focus obtained through a water path and through an aberrator path.

Measured amplitudes of the transmit focus obtained through a water path and through an aberrator path are plotted in FIG. 6. The left panels show maximum amplitude projections of the envelope in each Cartesian spatial dimension while the right panels show corresponding widths. The upper and middle panels are for the two orthogonal spatial dimensions parallel to the lateral dimensions of the transducer array aperture and the lower panels are for the depth dimension.

The aberrator path is the same as that for FIG. 3. The water-path waveforms were focused with geometric delays and the aberrator-path waveforms were focused with geometric delays, i.e., without compensation, and with compensation using time shifts estimated from waveforms produced by geometrically focused transmit waveforms in a random medium, time reversal of aberration responses obtained from statistical estimation of aberration by using random medium waveforms, and time reversal of path responses calculated from waveforms produced by a point reflector. The waveforms used in the statistical method were produced by transmit time-shift compensation estimated using geometrically focused random-medium waveforms. The central part of the compensated transmit focus is restored down at least to −15 dB from the peak by each method. Beyond the −20 dB level, however, the transmit focus produced using time reversal of statistically estimated aberration is substantially better overall than the transmit focus produced using time-shift compensation and is close to the focus produced using time reversal of the path response found from the point reflector as well as to the focus obtained through a water path. The plateau in the peripheral region of the lateral measurement of each transmit focus is a limit determined by noise. Although the plots are not shown to avoid cluttering the figure, re-estimation of the aberration response from measurements in which the transmit beam was formed using time reversal of the previous statistically determined aberration response yielded an aberration response that did not produce an appreciably better transmit focus than aberration response calculated using time-shift compensated illumination. Relative to the transmit beamforming efficiency obtained using time reversal of the aberration response calculated from the point reflector, the transmit beamforming efficiency for no compensation, time-shift compensation based on waveforms produced by a geometrically focused transmit beam, and time reversal of aberration statistically estimated using waveforms produced by a time-shift compensated transmit beam is 14.9, 68.1, and 78.0 percent, respectively.

Figure 7:
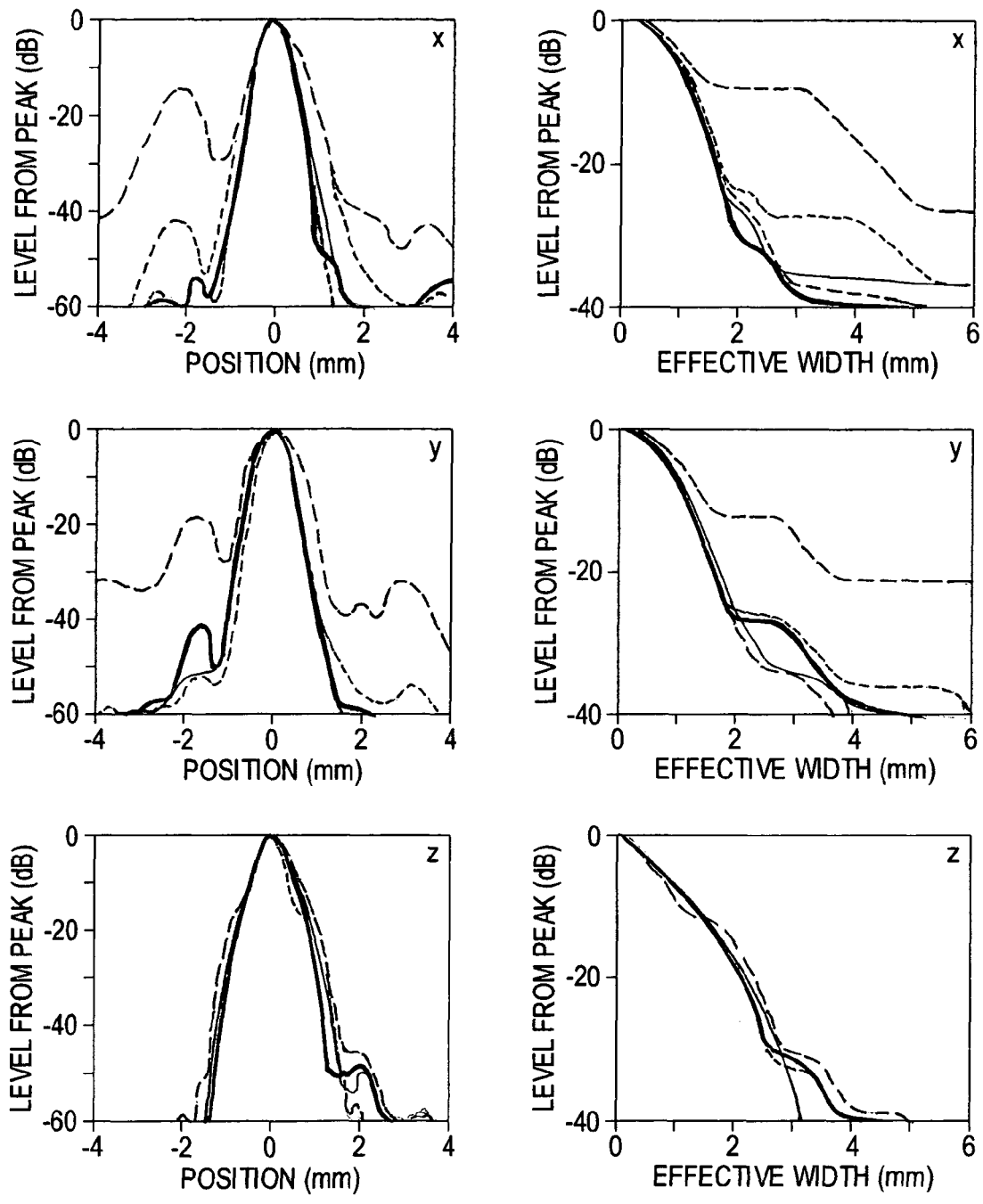
FIG. 7 is a set of plots showing amplitude projections and effective widths of the transmit-receive focus through a water path and through an aberrator path.

Amplitude projections and effective widths of the transmit-receive (two-way or pulse-echo) focus obtained through a water path and through an aberrator path are shown in FIG. 7. The left panels show maximum amplitude projections of the transmit-receive focus amplitude in each Cartesian spatial dimension while the right panels show corresponding effective widths. The upper and middle panels are for the two orthogonal spatial dimensions parallel to the lateral dimensions of transducer array aperture and the lower panels are for the depth dimension. The curves have the same correspondence to measurements as in FIG. 6.

The aberrator path is the same as that used for FIG. 3. Transmit and receive compensation each used time reversal of the aberration response (or time shifts in the case of time-shift compensation). The time shifts and aberration response are the same as used to obtain the curves in FIG. 6. The data show that the two-way response is restored to the water-path ideal down at least to −37 dB by both time-shift compensation and time reversal of statistically estimated responses. Beyond −40 dB, however, time reversal of the statistically determined aberration outperforms time-shift compensation substantially by producing a two-way focus nearly as good as the focus obtained through a water path and the focus produced using time reversal of the aberration response calculated from a point reflector. In particular, for lateral distances in the range of 1.5-4.0 mm away from the peak of the focus, using time reversal of statistically determined aberration produces a sensitivity that is 30-40 dB better than the uncompensated sensitivity. Relative to the receive beamforming efficiency obtained using time reversal of aberration response calculated from the point-reflector, the receive beamforming efficiency for no compensation, time-shift compensation based on waveforms produced by a geometrically focused transmit beam, and time reversal of aberration response statistically estimated from waveforms produced by a time-shift compensated transmit beam is 23.6, 83.4, and 96.2 percent, respectively.

Figure 8:
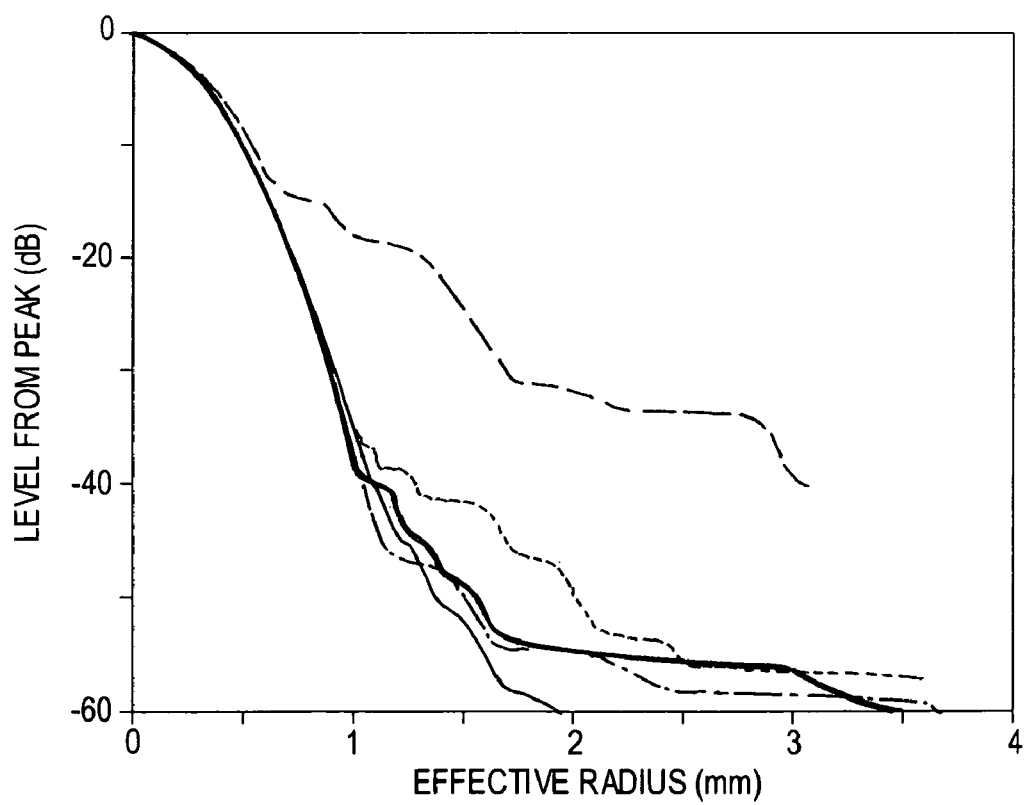
FIG. 8 is a plot of the transmit-receive effective radius of the focus obtained through an aberrator path with successive transmissions.

The effective radius of the transmit-receive focus obtained through an aberrator path using echo waveforms from four successive transmissions that start with geometric focusing and then use a compensation calculated from the preceding transmission is plotted in FIG. 8. The wide dashed line is for no compensation, i.e., geometric focusing. The wide dotted line is for time-shift compensation estimated from waveforms produced by geometrically focused random-medium illumination. The wide solid line is for time reversal of the aberration response statistically estimated from waveforms produced by the time-shift-compensated random-medium illumination. The narrow dashed line is for time reversal of the aberration response statistically estimated from waveforms produced by time reversal of the previous statistically estimated aberration response. The narrow solid line is for a focus produced through a water path by using geometric delays and is included as a reference.

The aberrator path is the same as for FIG. 3. The two-way effective radius obtained using compensation with time shifts estimated from geometrically focused illumination is substantially improved over the uncompensated focus. The following iteration that employs compensation statistically estimated from time-shift compensated illumination produces significant additional improvement in the effective radius. However, a further iteration that uses compensation statistically estimated from illumination using the previous statistical compensation yields little important improvement.

The data in FIG. 3 through FIG. 8 and the accompanying quantitative measures of performance indicate that the statistical method of estimating aberration from randommedium waveforms and then compensating the aberration by using the estimates can yield significantly improved transmit, receive, and transmit-receive focusing in the presence of strong aberration under realistic conditions.

The filter-bank model used in the analysis presented here provides a general description of linear propagation from a point source through an inhomogeneous medium. A time-shift screen in the aperture can be regarded as a special case. Accuracy of the filter-bank model is limited in principle only by the number of parameters used to define the filters. However, the accuracy of the parameter estimation is limited by the validity of the two basic assumptions that the random-medium second-order statistics are the same around each of the focuses and that the focuses are within an isoplanatic volume.

The assumption that the scattering-medium statistics are the same around each of the focuses was ideally satisfied in the reported measurements because the tissue-mimicking phantom is comprised of the same scattering material throughout a region much larger than that used for the focuses. The assumption that the focuses are all within an isoplanatic volume was checked experimentally by processing waveform sets received from a point reflector that was positioned at each of the 75-focuses and correlating the aberration response calculated from the 75-focus average with the aberration response calculated from the set of waveforms received from the common center of the polyhedra. A correlation coefficient of 0.983 was obtained. That high correlation or similarity justifies the validity of the isoplanatic volume assumption for the clinically relevant geometry employed for experiments in the preferred embodiment.

A number of other assumptions were made during the development of the expressions used to compute aberration magnitude and phase from the experimental measurements. The most noteworthy are the assumptions that result in the form of $\hat{\Omega}$, which is the integral factor in Eq. (21). Although those assumptions are described qualitatively, the excellent agreement between the experimental results obtained using the described statistical theory and the results obtained using a point reflector that essentially yields the true aberrations shows the validity of the assumptions in a practical setting.

Before the described set of 75 focuses was employed, waveforms were collected through a water path and through an aberrator path from a point reflector and from a random medium using focuses that were at the center and vertices of an icosahedron with a 0.5 mm radius and with a 1.0 mm radius. For the 0.70 mm water path −6 dB two-way beam width of the array used in the described studies, waveforms from the center and 12 vertices of the 0.5 mm radius icosahedron were not sufficiently independent to yield satisfactory spectral power estimates while waveforms from the vertices of the 1.0 mm icosahedron were relatively independent but estimates made with the 13 sample functions resulted in spectral power estimates with a relatively high variance. Using radially symmetric Gaussian-weighted overlapping scattering volumes clustered as in the preferred embodiment, a model for the variance of the spectral estimates showed the 75-focus estimates have about 0.4 the variance of the 13-focus estimates. The choice of focus separation and number of focuses in any particular setting depends, however, on the size of the isoplanatic volume that is determined by the length of the aberration path, the strength of the aberration, and the proximity of the aberration to the transmit-receive aperture.

A variance reduction factor is used to describe the rate of convergence and accuracy of spectra estimated from overlapping ultrasonic scattering volumes when the scattering is from a spatially uncorrelated medium. Assuming that the individual volumes are localized by a Gaussian window and that centers of the volumes are located on orbits of an icosahedral rotation group, the factor is minimized by adjusting the weight and radius of each orbit. The smallest possible value of the factor is found by allowing an unlimited number of centers constrained only to be within a ball rather than on icosahedral orbits. A significant reduction of variance can be achieved from centers in the confined volume, and this reduction is nearly the maximum obtainable from an unlimited number of centers in the same volume.

The effect of aberration on the focus produced by the beamformer in an ultrasonic b-scan instrument merits comment. A conventional beamformer, i.e., one using geometric focusing, implements a delay-and-sum operation that yields amplitude along the axis of an actual or virtual array of elements. A more general beamformer that applies different weights and phase to each frequency component of each waveform, i.e., one using a filter-and-sum operation, is required to compensate for aberration. In either case, however, the amplitude is influenced by scatterers offset from the focus and the quality of the focus is determined by the extent to which the influence of offset scatterers is suppressed. Maximum suppression during lossless propagation occurs when beamformation uses filters that are matched to the exact aberration factors but matched filter beamformation, i.e., time-reversal processing, has also been observed to provide high suppression in the presence of relatively homogeneous attenuation. If the aberration factors can only be estimated or if only time shifts are available, then the focus for the corresponding matched filters will be less than optimal. The quality of those filters is described by the beamforming efficiency that was defined for a receive focus and for a transmit focus because each of those efficiencies is equivalent to a correlation coefficient between the optimal filters and the estimated filters.

Computations using the Rayleigh-Sommerfeld diffraction formula were performed to simulate the focus obtained with different compensations. Those computations have the advantage of not requiring lossless propagation but assume the aberration factors are invariant throughout the region of the focus. The simulated focuses, however, extended beyond the region of aberration invariance so the results of the computations are not presented because they have a limited region of validity.

The importance of accounting for the phase of the $\hat{\Omega}$ term in Eq. (22) for the phase difference of the aberration at adjacent subapertures is worthy of special note. Aberration phase calculations that neglect that phase term and use the cross spectrum of measured signals at individual elements were found to contain a strong anomalous curvature. That led to the development of the described recursive procedure that uses signals at receive subapertures for cross spectrum calculations to make the contribution of that phase term negligible.

Visual and numerical comparison of the aberration magnitude and phase shown in FIG. 3 for a statistical calculation using random-medium waveforms and for a calculation using point-reflector waveforms indicates that the differences are small. Additional visual and numerical comparison of corresponding compensated transmit waveforms shown in FIG. 4 indicate that those differences are also small. A further comparison of the aberration determined by deconvolving a measured water path response from the measured aberration-path response with the aberration found by using the deterministic equivalents of the spectral power estimates for random-medium waveforms yielded similarly small differences. The small differences between statistically determined aberration and compensation and corresponding references show that aberration can be accurately estimated from random-medium waveforms using the described statistical approach and that compensation can be performed accurately with the estimates.

Visual comparison of compensated and uncompensated waveforms presented in FIG. 5 and numerical comparison of their corresponding waveform similarity factors show that the statistically determined compensation of the waveforms greatly increases their similarity over that of uncompensated waveforms to near the similarity of corresponding water-path waveforms. Those geometrically corrected waveforms are analogous to waveforms summed by the beamformer in an ultrasonic imaging instrument to obtain an a-line for a b-scan image. Time-aligned waveforms at that point during beam formation are necessary but not sufficient for an ideal focus, other factors such as apodization being equal. Time alignment of waveforms is directly connected with differences in their Fourier phase and those phase differences are generally more important at the focus than differences in Fourier magnitude. Since the waveform similarity factor is more strongly influenced by Fourier phase differences than Fourier magnitude differences, the correspondence between a high waveform similarity factor, e.g., between 0.9 and 1.0 in the case of point-reflector waveforms, and the time alignment necessary to concentrate the field at the focus permits use of the waveform similarity factor, which is a single number, to assess the quality of compensation at a focus. However, the waveform similarity factor is limited to comparisons using the same set of waveforms before and after compensation and is not a good measure of the extent to which scattering from off-axis is suppressed at the focus because that suppression is primarily determined by Fourier magnitude differences to which the waveform similarity factor is relatively insensitive. The suppression of off-axis scattering is measured by the relative beamforming efficiency reported for the transmit focus and for the receive focus.

Noteworthy is the broad bandwidth of the compensated transmit waveforms in FIG. 4 relative to the bandwidth of the corresponding uncompensated waveforms in FIG. 5 with which computation of the path responses started. The broad bandwidth of the waveforms compensated by statistically determined aberration comes from both the use of the original uncompensated transmit Gaussian pulse spectrum and the way the aberration response is computed. The tails of the original Gaussian spectrum outside the band of the aberration estimates permit the bandpass transfer function of the array elements to limit the band of the transmit spectrum naturally. The spectral tails also establish a broad band for the aberration estimates although the signal-to-noise ratios for those estimates diminish at the band edges. To compensate for that diminished signal-to-noise ratio as well as to extend the band of the aberration estimates, a finite-impulse-response filter structure was used in a weighted-least-mean-square-error calculation to obtain temporal representations of the aberration from the aberration frequency-domain magnitude and phase. An important consequence of the compensated transmit waveform bandwidth is that axial resolution at the transmit focus is not degraded as has been reported by others when transmit waveforms are obtained by direct time reversal of receive waveforms band limited from multiple passes through the receiving and transmitting elements.

The transmit beam measurements presented in FIG. 6 show that time-shift compensation estimated from waveforms produced by geometrically focused random-medium illumination has restored the central region of the focus down to the range of 18-20 dB. Compensation using time reversal of statistically estimated aberration response calculated from waveforms produced by a time-shift compensated transmit beam, however, reduced the peripheral level of the transmit focus by up to 8 dB more. The noise limit in the lateral measurement of the focus is the result of using a 0.2 mm diameter hydrophone to get satisfactory resolution around the peak of the focus. The noted but not shown similarity of the transmit focus produced using time reversal of the aberration response re-estimated using the previous statistically determined aberration response and the focus produced using the aberration response estimated from time-shift compensated illumination indicates that the coherence of the waveforms produced by a time-shift compensated transmit focus can yield satisfactory estimates of aberration magnitude and phase differences for computation of aberration path responses.

The amplitude projections and effective widths of the transmit-receive (two-way or pulse-echo) focus presented in FIG. 7 are perhaps the single most important descriptions of resolution because those show the combined transmit-receive response to off-axis scatterers. As with the measured transmit focuses, the pulse-echo resolution is substantially improved by time-shift compensation over the corresponding resolution obtained without compensation. However, the peripheral level of the pulse-echo focus obtained using compensation from the statistically estimated aberration response is not only lower than the level obtained from time-shift compensation alone but is near the level of the water-path and aberrator-path compensation using time reversal of point-reflector waveforms. Two-way focus restoration to the levels shown is important because b-scan images produced by ultrasonic imaging instruments are typically displayed on a log scale with a 40-50 dB dynamic range. Thus, compensation using statistically based estimates of aberration has the potential not only to restore ultrasonic b-scan image point resolution to water path or near diffraction-limited quality but also to restore contrast resolution to water path or near diffraction-limited quality.

The transmit-receive focus effective radius plotted in FIG. 8 for the focus obtained using compensation from successive estimates of aberration indicate that the estimates of aberration in the reported experiments converge to essentially their final value after two iterations and that that value produces a focus that is near the focus obtainable through a water path. The ability to recover nearly water path performance from two iterations is attributed to increased validity of the isoplanatic volume assumption when the transmit beam is localized to a designated position by improved compensation. Since time-shift compensation using estimates from focuses produced by geometric delays in a random medium was found to yield a focus satisfactory for relatively accurate statistical estimation of aberration, use of time-shift compensation for focusing in the first iteration is advantageous because less computation than in the described statistical approach is required. The observed rapid convergence of statistically estimated path responses to their final values is important for practical implementation of the method in ultrasonic b-scan imaging and in other applications as well.

The collection of measurements provides an experimental validation of the described statistical method for determination of aberration and phase and indicates that the assumptions used to develop the expressions for aberration magnitude and phase can be satisfied in a realistic pulse-echo configuration. Further theoretical development and experimental investigation are, however, needed to quantify and verify relations between the strength and position of the aberration and the isoplanatic patch needed to obtain sample functions for the calculation of cross spectra. Nevertheless, the presented measurements and experience with other measurements not included because transmit beam or transmit-receive resolution measurements were not made and sometimes only 13 sample functions were available indicate that the described statistical method is robust and can be broadly applied whenever the basic assumptions in the theoretical development are satisfied.

While a preferred embodiment has been set forth in detail above, those skilled in the art who have reviewed the present disclosure will readily appreciate that other embodiments can be realized within the scope of the present invention. For example, numerical values are illustrative rather than limiting. Therefore, the present invention should be construed as limited only by the appended claims.

We claim:

1. A method for estimating an aberration in propagation of an ultrasonic wave from an aperture through an aberration path, using a transducer array comprising a plurality of elements, the method comprising:
   (a) illuminating a group of sample volumes of random media to produce scattered signals and receiving the scattered signals at each of the elements in the transducer array;
   (b) computing a power spectrum estimate at each of the elements in the transducer array by using the scattered signals received in step (a) for all of the elements in the transducer array;
   (c) estimating a magnitude of a frequency-domain aberration factor at each of the elements of the transducer array by normalizing the power spectrum computed in step (b);
   (d) estimating a phase of the frequency-domain aberration factor at each of the elements of the transducer array by taking cross-spectral estimates and calculating phase differences from the cross-spectral estimates; and
   (e) estimating the aberration from the magnitude estimated in step (c) and the phase estimated in step (d).

2. The method of claim 1, wherein step (c) comprises normalizing the power spectrum using a normalization factor empirically determined using an aberrationless medium and a phantom.

3. The method of claim 1, wherein step (c) comprises normalizing the power spectra for all of the elements of the transducer array by the average of the power spectra for all the elements of the transducer array.

4. The method of claim 1, wherein step (c) comprises normalizing the power spectra using a parametric model for attenuation.

5. The method of claim 1, wherein the cross-spectral estimates are taken from individual ones of the elements of the transducer array.

6. The method of claim 5, wherein step (d) is performed recursively.

7. The method of claim 1, wherein step (d) comprises:
   (i) selecting initial values for the estimated frequency-domain phases;
   (ii) correcting frequency components of the signals for all of the elements of the transducer array using the estimated frequency-domain phases;

(iii) estimating phase differences between values of the estimated frequency-domain phases at the adjacent elements from the cross-spectral estimates of the elements;

(iv) estimating the phase of the aberration frequency response for each array element from the phase differences estimated in step (d)(iii);

(v) modifying the estimated phase of the aberration frequency response for each array element in accordance with the phases of the element aberration frequency responses estimated in step (d)(iv); and (vii) performing steps (d)(ii) through (d)(v) until step (d) converges.

8. The method of claim 1, wherein the cross-spectral estimates are taken from sub-apertures in the transducer array.

9. The method of claim 8, wherein step (d) comprises:
(i) selecting initial values for the estimated frequency-domain phases;
(ii) correcting frequency components of the signals for all of the receivers using the estimated frequency-domain phase;
(iii) convolving the frequency components corrected in step (d)(ii) with weights to obtain subaperture signal spectra;
(iv) estimating phase differences between values of the estimated frequency-domain phase at the adjacent sub-apertures from the cross-spectral estimates of the sub-apertures;
(v) estimating the phase of the subaperture aberration frequency response for each subaperture from the phase differences estimated in step (d)(iv);
(vi) modifying the estimated phase of the aberration frequency response for each array element in accordance with the phases of the subaperture aberration frequency responses estimated in step (d)(v); and
(vii) performing steps (d)(ii) through (d)(vi) until step (d) converges.

10. The method of claim 9, wherein step (d)(vi) comprises adding the estimated frequency-domain phase and $\zeta$ times the subaperture aberration frequency response, wherein $\zeta$ is a predetermined positive parameter.

11. The method of claim 10, wherein $\zeta=1$.

12. The method of claim 1, wherein:
step (c) comprises normalizing the power spectrum using a signal normalization technique selected from the group consisting of:
(i) using a normalization factor empirically determined using an aberrationless medium and a phantom;
(ii) normalizing the power spectra for all of the elements of the transducer array by the average of the power spectra for all the elements of the transducer array; and
(iii) normalizing the power spectra using a parametric model for attenuation; and
step (d) comprises a technique for taking the cross-spectral estimates selected from the group consisting of:
(i) taking the cross-spectral estimates from the elements in the transducer array;
(ii) taking the cross-spectral elements from the elements in the transducer array with recursion;
(iii) taking the cross-spectral estimates from sub-apertures in the transducer array;
(iv) taking the cross-spectral estimates from the sub-apertures in the transducer array with recursion;
(v) taking the cross-spectral estimates from the sub-apertures in the transducer array with recursion and an update parameter $\zeta$; and (vi) taking the cross-spectral estimates from the sub-apertures in the transducer array with recursion and an update parameter $\zeta=1$.

13. A method for transmitting an ultrasonic wave from an aperture through an aberration path to correct for an estimated aberration in propagation of the ultrasonic wave from the aperture through the aberration path, using a transducer array comprising a plurality of elements, the method comprising:
(a) illuminating a group of sample volumes of random media to produce scattered signals and receiving the scattered signals at each of the elements in the transducer array;
(b) computing a power spectrum estimate at each of the elements in the transducer array by using the scattered signals received in step (a) for all of the elements in the transducer array;
(c) estimating a magnitude of a frequency-domain aberration factor at each of the elements of the transducer array by normalizing the power spectrum computed in step (b);
(d) estimating a phase of the frequency-domain aberration factor at each of the elements of the transducer array by taking cross-spectral estimates and calculating phase differences from the cross-spectral estimates;
(e) estimating the aberration from the magnitude estimated in step (c) and the phase estimated in step (d);
(f) transmitting the ultrasonic wave through the aberration path; and
(g) applying a correction in step (f) in accordance with the aberration estimated in step (e).

14. The method of claim 13, wherein step (c) comprises normalizing the power spectrum using a normalization factor empirically determined using an aberrationless medium and a phantom.

15. The method of claim 13, wherein step (c) comprises normalizing the power spectra for all of the elements of the transducer array by the average of the power spectra for all the elements of the transducer array.

16. The method of claim 13, wherein step (c) comprises normalizing the power spectra using a parametric model for attenuation.

17. The method of claim 13, wherein the cross-spectral estimates are taken from individual ones of the elements of the transducer array.

18. The method of claim 17, wherein step (d) is performed recursively.

19. The method of claim 13, wherein step (d) comprises:
(i) selecting initial values for the estimated frequency-domain phases;
(ii) correcting frequency components of the signals for all of the elements of the transducer array using the estimated frequency-domain phases;
(iii) estimating phase differences between values of the estimated frequency-domain phase at the adjacent elements from the cross-spectral estimates of the elements;
(iv) estimating the phase of the aberration frequency response for each array element from the phase differences estimated in step (d)(iii);
(v) modifying the estimated phase of the aberration frequency response for each array element in accordance with the phases of the element aberration frequency responses estimated in step (d)(iv); and
(vii) performing steps (d)(ii) through (d)(v) until step (d) converges.

20. The method of claim 13, wherein the cross-spectral estimates are taken from sub-apertures in the transducer array.

21. The method of claim 20, wherein step (d) comprises:
(i) selecting initial values for the estimated frequency-domain phases;
(ii) correcting frequency components of the signals for all of the receivers using the estimated frequency-domain phases;
(iii) convolving the frequency components corrected in step (d)(ii) with weights to obtain subaperture signal spectra;
(iv) estimating phase differences between values of the estimated frequency-domain phase at the adjacent subapertures from the cross-spectral estimates of the subapertures;
(v) estimating the phase of the subaperture aberration frequency response for each subaperture from the phase differences estimated in step (d)(iv);
(vi) modifying the estimated phase of the aberration frequency response for each array element in accordance with the phases of the subaperture aberration frequency responses estimated in step (d)(v); and
(vii) performing steps (d)(ii) through (d)(vi) until step (d) converges.

22. The method of claim 21, wherein step (d)(vi) comprises adding the estimated frequency-domain phase and $\zeta$ times the subaperture aberration frequency response, wherein $\zeta$ is a predetermined positive parameter.

23. The method of claim 22, wherein $\zeta=1$.

24. The method of claim 13, wherein:
step (c) comprises normalizing the power spectrum using a signal normalization technique selected from the group consisting of:
(i) using a normalization factor empirically determined using an aberrationless medium and a phantom;
(ii) normalizing the power spectra for all of the elements of the transducer array by the average of the power spectra for all the elements of the transducer array; and
(iii) normalizing the power spectra using a parametric model for attenuation; and
step (d) comprises a technique for taking the cross-spectral estimates selected from the group consisting of:
(i) taking the cross-spectral estimates from the elements in the transducer array;
(ii) taking the cross-spectral elements from the elements in the transducer array with recursion;
(iii) taking the cross-spectral estimates from sub-apertures in the transducer array;
(iv) taking the cross-spectral estimates from the sub-apertures in the transducer array with recursion;
(v) taking the cross-spectral estimates from the sub-apertures in the transducer array with recursion and an update parameter $\zeta$; and
(vi) taking the cross-spectral estimates from the sub-apertures in the transducer array with recursion and an update parameter $\zeta=1$.

25. The method of claim 13, wherein step (g) is performed using matched filters.

26. The method of claim 13, wherein step (g) is performed using inverse filters.

27. The method of claim 13, wherein step (g) is performed using normalized matched filters.

28. The method of claim 13, wherein step (g) is performed using time-shift correactions that are determined from the estimated aberration frequency responses.

29. A method for receiving an ultrasonic wave that has been transmitted from an aperture through an aberration path to correct for an estimated aberration in propagation of the ultrasonic wave from the aperture through the aberration path, using a transducer array comprising a plurality of elements, the method comprising:
(a) illuminating a group of sample volumes of random media to produce scattered signals and receiving the scattered signals at each of the elements in the transducer array;
(b) computing a power spectrum estimate at each of the elements in the transducer array by using the scattered signals received in step (a) for all of the elements in the transducer array;
(c) estimating a magnitude of a frequency-domain aberration factor at each of the elements of the transducer array by normalizing the power spectrum computed in step (b);
(d) estimating a phase of the frequency-domain aberration factor at each of the elements of the transducer array by taking cross-spectral estimates and calculating phase differences from the cross-spectral estimates;
(e) estimating the aberration from the magnitude estimated in step (c) and the phase estimated in step (d);
(f) receiving the ultrasonic wave that has been transmitted through the aberration path; and
(g) applying a correction in step (f) in accordance with the aberration estimated in step (e).

30. The method of claim 29, wherein step (c) comprises normalizing the power spectrum using a normalization factor empirically determined using an aberrationless medium and a phantom.

31. The method of claim 29, wherein step (c) comprises normalizing the power spectra for all of the elements of the transducer array by the average of the power spectra for all the elements of the transducer array.

32. The method of claim 29, wherein step (c) comprises normalizing the power spectra using a parametric model for attenuation.

33. The method of claim 29, wherein the cross-spectral estimates are taken from individual ones of the elements of the transducer array.

34. The method of claim 33, wherein step (d) is performed recursively.

35. The method of claim 29, wherein step (d) comprises:
(i) selecting initial values for the estimated frequency-domain phases;
(ii) correcting frequency components of the signals for all of the elements of the transducer array using the estimated frequency-domain phase;
(iii) estimating phase differences between values of the estimated frequency-domain phase at the adjacent elements from the cross-spectral estimates of the elements;
(iv) estimating the phase of the aberration frequency response for each array element from the phase differences estimated in step (d)(iii);
(v) modifying the estimated phase of the aberration frequency response for each array element in accordance with the phases of the element aberration frequency responses estimated in step (d)(iv); and
(vii) performing steps (d)(ii) through (d)(v) until step (d) converges.

36. The method of claim 29, wherein the cross-spectral estimates are taken from sub-apertures in the transducer array.

37. The method of claim 36, wherein step (d) comprises:
(i) selecting initial values for the estimated frequency-domain phases;

(ii) correcting frequency components of the signals for all of the receivers using the estimated frequency-domain phase;

(iii) convolving the frequency components corrected in step (d)(ii) with weights to obtain subaperture signal spectra;

(iv) estimating phase differences between values of the estimated frequency-domain phase at the adjacent subapertures from the cross-spectral estimates of the subapertures;

(v) estimating the phase of the subaperture aberration frequency response for each subaperture from the phase differences estimated in step (d)(iv);

(vi) modifying the estimated phase of the aberration frequency response for each array element in accordance with the phases of the subaperture aberration frequency responses estimated in step (d)(v); and (vii) performing steps (d)(ii) through (d)(vi) until step (d) converges.

38. The method of claim 37, wherein step (d)(vi) comprises adding the estimated frequency-domain phase and $\zeta$ times the subaperture aberration frequency response, wherein $\zeta$ is a predetermined positive parameter.

39. The method of claim 38, wherein $\zeta=1$.

40. The method of claim 29, wherein:

step (c) comprises normalizing the power spectrum using a signal normalization technique selected from the group consisting of:
(i) using a normalization factor empirically determined using an aberrationless medium and a phantom;
(ii) normalizing the power spectra for all of the elements of the transducer array by the average of the power spectra for all the elements of the transducer array; and
(iii) normalizing the power spectra using a parametric model for attenuation; and step (d) comprises a technique for taking the cross-spectral estimates selected from the group consisting of:
(i) taking the cross-spectral estimates from the elements in the transducer array;
(ii) taking the cross-spectral elements from the elements in the transducer array with recursion;
(iii) taking the cross-spectral estimates from sub-apertures in the transducer array;
(iv) taking the cross-spectral estimates from the sub-apertures in the transducer array with recursion;
(v) taking the cross-spectral estimates from the sub-apertures in the transducer array with recursion and an update parameter $\zeta$; and
(vi) taking the cross-spectral estimates from the sub-apertures in the transducer array with recursion and an update parameter $\zeta=1$.

41. The method of claim 29, wherein step (g) is performed using matched filters.

42. The method of claim 29, wherein step (g) is performed using inverse filters.

43. The method of claim 29, wherein step (g) is performed using normalized matched filters.

44. The method of claim 29, wherein step (g) is performed using time-shift correactions that are determined from the estimated aberration frequency responses.

45. An ultrasound system for transmitting an ultrasonic wave from an aperture through an aberration to correct for an estimated aberration in propagation of the ultrasonic wave from the aperture through the aberration path, the ultrasound system comprising:

an ultrasound transmit-receive apparatus for transmitting and receiving the ultrasonic wave, the ultrasound transmit-receive apparatus comprising a transducer array with a plurality of elements; and a processing apparatus, in electronic communication with the ultrasound transmit-receive apparatus, for:

(a) illuminating a group of sample volumes of random media to produce scattered signals and receiving the scattered signals at each of the elements in the transducer array;

(b) computing a power spectrum estimate at each of the elements in the transducer array by using the scattered signals received in step (a) for all of the elements in the transducer array;

(c) estimating a magnitude of a frequency-domain aberration factor at each of the elements of the transducer array by normalizing the power spectrum computed in step (b);

(d) estimating a phase of the frequency-domain aberration factor at each of the elements of the transducer array by taking cross-spectral estimates and calculating phase differences from the cross-spectral estimates;

(e) estimating the aberration from the magnitude estimated in step (c) and the phase estimated in step (d);

(f) controlling the ultrasound transmit-receive apparatus to transmit the ultrasonic wave through the aberration path;

(g) receiving, from the ultrasound transmit-receive apparatus, signals representing the received ultrasonic wave; and (h) applying a correction in at least one of steps (f) and (g) in accordance with the aberration estimated in step (e).

46. The ultrasound system of claim 45, wherein the processing apparatus performs step (c) by normalizing the power spectrum using a normalization factor empirically determined using an aberrationless medium and a phantom.

47. The ultrasound system of claim 45, wherein the processing apparatus performs step (c) by normalizing the power spectra for all of the elements of the transducer array by the average of the power spectra for all the elements of the transducer array.

48. The ultrasound system of claim 45, wherein the processing apparatus performs step (c) by normalizing the power spectra using a parametric model for attenuation.

49. The ultrasound system of claim 45, wherein the cross-spectral estimates are taken from individual ones of the elements of the transducer array.

50. The ultrasound system of claim 49, wherein the processing apparatus performs step (d) recursively.

51. The ultrasound apparatus of claim 45, wherein the processing apparatus performs step (d) by:

(i) selecting initial values for the estimated frequency-domain phases;

(ii) correcting frequency components of the signals for all of the elements of the transducer array using the estimated frequency-domain phase;

(iii) estimating phase differences between values of the estimated frequency-domain phase at the adjacent elements from the cross-spectral estimates of the elements;

(iv) estimating the phase of the aberration frequency response for each array element from the phase differences estimated in step (d)(iii);

(v) modifying the estimated phase of the aberration frequency response for each array element in accordance with the phases of the element aberration frequency responses estimated in step (d)(iv); and (vii) performing steps (d)(ii) through (d)(v) until step (d) converges.

52. The ultrasound system of claim 45, wherein the cross-spectral estimates are taken from sub-apertures in the transducer array.

53. The ultrasound system of claim 52, wherein the processing apparatus performs step (d) by:
   (i) selecting initial values for the estimated frequency-domain phases;
   (ii) correcting frequency components of the signals for all of the receivers using the estimated frequency-domain phase;
   (iii) convolving the frequency components corrected in step (d)(ii) with weights to obtain subaperture signal spectra;
   (iv) estimating phase differences between values of the estimated frequency-domain phase at the adjacent sub-apertures from the cross-spectral estimates of the sub-apertures;
   (v) estimating the phase of the subaperture aberration frequency response for each subaperture from the phase differences estimated in step (d)(iv);
   (vi) modifying the estimated phase of the aberration frequency response for each array element in accordance with the phases of the subaperture aberration frequency responses estimated in step (d)(v); and
   (vii) performing steps (d)(ii) through (d)(vi) until step (d) converges.

54. The ultrasound system of claim 53, wherein the processing apparatus performs step (d)(vi) by adding the estimated frequency-domain phase and $\zeta$ times the subaperture aberration frequency response, wherein $\zeta$ is a predetermined positive parameter.

55. The ultrasound system of claim 54, wherein $\zeta=1$.

56. The ultrasound system of claim 45, wherein:
   the processing apparatus performs step (c) by normalizing the power spectrum using a signal normalization technique selected from the group consisting of:
   (i) using a normalization factor empirically determined using an aberrationless medium and a phantom;
   (ii) normalizing the power spectra for all of the elements of the transducer array by the average of the power spectra for all the elements of the transducer array; and
   (iii) normalizing the power spectra using a parametric model for attenuation; and
   the processing apparatus performs step (d) using a technique for taking the cross-spectral estimates selected from the group consisting of:
   (i) taking the cross-spectral estimates from the elements in the transducer array;
   (ii) taking the cross-spectral elements from the elements in the transducer array with recursion;
   (iii) taking the cross-spectral estimates from sub-apertures in the transducer array;
   (iv) taking the cross-spectral estimates from the sub-apertures in the transducer array with recursion;
   (v) taking the cross-spectral estimates from the sub-apertures in the transducer array with recursion and an update parameter $\zeta$; and
   (vi) taking the cross-spectral estimates from the sub-apertures in the transducer array with recursion and an update parameter $\zeta=1$.

57. The ultrasound system of claim 45, wherein the processing apparatus performs step (h) using matched filters.

58. The ultrasound system of claim 45, wherein the processing apparatus performs step (h) using inverse filters.

59. The ultrasound system of claim 45, wherein the processing apparatus performs step (h) using normalized matched filters.

60. The ultrasound system of claim 45, wherein the processing apparatus performs step (h) using time-shift corrections that are determined from the estimated aberration frequency responses.

* * * * *